United States Patent
Kumei et al.

(10) Patent No.: US 8,932,772 B2
(45) Date of Patent: Jan. 13, 2015

(54) FUEL CELL SYSTEM AND METHOD OF STOPPING FUEL CELL SYSTEM

(75) Inventors: Hideyuki Kumei, Sunto-gun (JP); Manabu Kato, Susono (JP); Michihito Tanaka, Mishima (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 480 days.

(21) Appl. No.: 13/500,736

(22) PCT Filed: Oct. 7, 2009

(86) PCT No.: PCT/JP2009/005214
§ 371 (c)(1),
(2), (4) Date: Apr. 6, 2012

(87) PCT Pub. No.: WO2011/042932
PCT Pub. Date: Apr. 14, 2011

(65) Prior Publication Data
US 2012/0276460 A1    Nov. 1, 2012

(51) Int. Cl.
*H01M 8/04* (2006.01)
*H01M 8/06* (2006.01)

(52) U.S. Cl.
USPC ............ 429/410; 429/446; 429/415; 429/429

(58) Field of Classification Search
None
See application file for complete search history.

(56) References Cited

U.S. PATENT DOCUMENTS

2005/0074641 A1*  4/2005  Inai et al. .................. 429/13
2008/0182138 A1    7/2008  Salvador et al.

FOREIGN PATENT DOCUMENTS

| JP | 10-321248 | A |   | 12/1998 |   |
|----|-----------|---|---|---------|---|
| JP | 2003-504807 | A |   | 2/2003 |   |
| JP | 2003-272686 | A |   | 9/2003 |   |
| JP | 4028363 | B2 |   | 6/2004 |   |
| JP | 2005-116269 |   | * | 4/2005 | ............. H01M 8/04 |
| JP | 2005-116269 | A |   | 4/2005 |   |
| JP | 2006-066107 | A |   | 3/2006 |   |
| JP | 2006-147250 |   | * | 6/2006 | ............. H01M 8/04 |
| JP | 2006-147250 | A |   | 6/2006 |   |
| JP | 2007-109529 |   | * | 4/2007 | ............. H01M 8/04 |
| JP | 2007-109529 | A |   | 4/2007 |   |
| JP | 2007-157530 | A |   | 6/2007 |   |

OTHER PUBLICATIONS

International Search Report issued Jan. 12, 2010 in PCT/JP2009/005214.

* cited by examiner

*Primary Examiner* — Patrick Ryan
*Assistant Examiner* — Angela Martin
(74) *Attorney, Agent, or Firm* — Kenyon & Kenyon LLP

(57) ABSTRACT

In a fuel cell system, a controller is programmed to control a first gas supply mechanism to deliver a first gas containing a fuel gas to a cathode in a pre-stop process performed at a system stop of the fuel cell system. The controller is programmed to control the first gas supply mechanism to stop the delivery of the first gas in a first state where a partial pressure difference between an anode and the cathode with respect to at least the fuel gas of remaining gases in the anode and in the cathode is reduced to or below a preset reference value.

16 Claims, 23 Drawing Sheets

FUEL CELL SYSTEM AND METHOD OF STOPPING FUEL CELL SYSTEM

This is a 371 national phase application of PCT/JP2009/005214 filed 7 Oct. 2009, the contents of which are incorporated herein by reference.

FIELD OF THE INVENTION

The present invention relates to a fuel cell system and a method of stopping the fuel cell system.

BACKGROUND OF THE INVENTION

In a fuel cell system including a fuel cell, the fuel cell generates electric power through electrochemical reaction with supply of a fuel gas (e.g., hydrogen) and an oxidizing gas (e.g., the air). At the stopping process of the fuel cell system, the supply of the fuel gas and the oxidizing gas is stopped. After the system stop, the air may be introduced from outside of the fuel cell to the cathode, and part of the introduced air may permeate through the electrolyte membrane to reach the anode. This may raise the cathode electrode potential and cause oxidation of the carbon component material of the cathode (for example, carbon for the gas diffusion layer or carbon used as the catalyst support).

One proposed technique against this problem supplies hydrogen and fills the supplied hydrogen to the cathode during system stopping process of the fuel cell system (for example, Patent Literature 1).

CITATION LIST

Patent Literatures

Patent Literature 1: JP-A-2006-147250
Patent Literature 2: Japanese Patent No. 4028363
Patent Literature 3: JP-A-2003-504807
Patent Literature 5: JP-A-2006-066107

SUMMARY OF THE INVENTION

Technical Problem

Even when hydrogen is filled into the cathode, with elapse of time since the system stop, the air may be introduced from outside the fuel cell into the cathode and further permeate through the electrolyte membrane of the fuel cell to reach the anode. This may cause oxidation of the cathode component material.

Consequently, in order to address the problem described above, there is a need to prevent oxidation of the cathode component material after stop of the fuel cell system.

Solution to Problem

In order to achieve at least part of the foregoing, the present invention provides various aspects and embodiments described below.

[First Aspect]
A fuel cell system, comprising:
a first fuel cell structured to have an anode and a cathode provided across an electrolyte membrane;
a first gas supply mechanism configured to deliver a first gas containing a fuel gas to the cathode; and
a controller programmed to control operation of the fuel cell system, wherein the controller is programmed to control the first gas supply mechanism to deliver the first gas to the cathode in a pre-stop process performed at a system stop of the fuel cell system, and the controller is programmed to control the first gas supply mechanism to stop the delivery of the first gas in a first state where a partial pressure difference between the anode and the cathode with respect to at least the fuel gas of remaining gases in the anode and in the cathode is reduced to or below a preset reference value.

The fuel cell system according to the first aspect stops the delivery of the first gas in the first state and thereby prevents permeation of the fuel gas across the electrolyte membrane after the system stop by the partial pressure difference of the fuel gas between the anode and the cathode (hereinafter also called "two electrodes") as the driving force. This reduces the variation of the cathode total pressure and prevents introduction of the air from outside the fuel cell into the cathode, thus effectively inhibiting oxidation of the cathode component material after the system stop. When the gas component remaining in the anode and the cathode is only the fuel gas, the partial pressure here means the total pressure.

[Second Aspect]
A fuel cell system, comprising:
a first fuel cell structured to have an anode and a cathode provided across an electrolyte membrane, wherein the first fuel cell generates electric power with supply of hydrogen as a fuel gas to the anode and supply of the air as an oxidizing gas to the cathode;
a first gas supply mechanism configured to deliver a first gas containing a fuel gas to the cathode; and
a controller programmed to control operation of the fuel cell system, wherein the controller is programmed to control the first gas supply mechanism to deliver the first gas to the cathode in a pre-stop process performed at a system stop of the fuel cell system, and the controller is programmed to control the first gas supply mechanism to stop the delivery of the first gas in a second state where a partial pressure difference of each gas component between the anode and the cathode with respect to nitrogen and the fuel gas remaining in the anode and in the cathode is reduced to or below a preset reference value.

The fuel cell system according to the second aspect stops the delivery of the first gas in the second state and thereby prevents permeation of the fuel gas across the electrolyte membrane after the system stop by the partial pressure differences of nitrogen and the fuel gas between the two electrodes as the driving force. This further reduces the variation of the cathode total pressure and prevents introduction of the air from outside the fuel cell into the cathode, thus more effectively inhibiting oxidation of the cathode component material after the stop of the fuel cell system.

[Third Aspect]
The fuel cell system according to either one of the first and second aspects, further comprising:
an anode gas supply/exhaust system configured to supply and discharge the fuel gas to and from the anode during normal power generation of the first fuel cell; and
a cathode gas supply/exhaust system configured to supply and discharge an oxidizing gas to and from the cathode during normal power generation of the first fuel cell, wherein
the first gas supply mechanism comprises a first power supply configured to apply a predetermined voltage to the first fuel cell, and wherein
in the pre-stop process, after controlling the cathode gas supply/exhaust system to stop the supply of the oxidizing gas to the cathode, while continuing the supply of the fuel gas to the anode by the anode gas supply/exhaust system, the controller is programmed to control the first power supply to apply the predetermined voltage to the first fuel cell, so as to deliver the fuel gas as the first gas to the cathode via the first gas supply mechanism.

The fuel cell system according to the third aspect electrochemically delivers hydrogen supplied to the anode, to the cathode, thus enabling the first gas to be evenly distributed over the whole area of the cathode across the electrolyte membrane.

[Fourth Aspect]

The fuel cell system according to the third aspect, further having:

a first drive mode in which concentration of oxygen remaining in the cathode is reduced below a level before start of the pre-stop process, wherein before controlling the first gas supply mechanism to deliver the first gas to the cathode, the controller is programmed to set the first drive mode to reduce the concentration of oxygen remaining in the cathode to a specific condition below the level before start of the pre-stop process.

The fuel cell system according to the fourth aspect additionally prevents the fuel gas delivered to the cathode by the first gas supply mechanism from reacting with oxygen and combusting on the cathode catalyst.

[Fifth Aspect]

The fuel cell system according to either one of the first and second aspects, wherein the controller is programmed to set a smaller stoichiometric ratio to the first fuel cell than a stoichiometric ratio of an oxidizing gas supplied to the cathode during normal power generation and controls the first fuel cell to start power generation with the smaller stoichiometric ratio, so as to deliver the first gas to the cathode by the first gas supply mechanism.

The fuel cell system according to the fifth aspect enables the first gas to be readily delivered to the cathode by simply setting the smaller stoichiometric ratio of the oxidizing gas than the level during normal operation.

[Sixth Aspect]

The fuel cell system according to the fifth aspect, further comprising:

a temperature sensor configured to measure a value relating to temperature of a power generation assembly of the first fuel cell, wherein the controller is programmed to control the first gas supply mechanism to deliver the first gas to the cathode in the pre-stop process, when the temperature of the power generation assembly of the first fuel cell based on the measurement value of the temperature sensor is higher than 0° C., and the controller is programmed to stop the fuel cell system without controlling the first gas supply mechanism to deliver the first gas to the cathode, when the temperature of the power generation assembly of the first fuel cell based on the measurement value of the temperature sensor is not higher than 0° C.

The inventors have found that power generation of the fuel cell at the temperature of the power generation assembly of the fuel cell of not higher than 0° C. and with the smaller stoichiometric ratio of the oxidizing gas than the level during normal power generation results in performance degradation of a cathode catalyst layer as the component material of the cathode. The temperature of the power generation assembly of not higher than 0° C. can inhibit oxidation of the cathode component material even in the condition of the increasing cathode electrode potential. The fuel cell system according to the sixth aspect determines whether the first gas is to be delivered to the cathode, based on the temperature of the power generation assembly, thus inhibiting oxidation of the cathode component material while preventing performance degradation of the cathode catalyst layer.

[Seventh Aspect]

The fuel cell system according to any one of the first to sixth aspects, wherein the first gas supply mechanism comprises a first gas circulation mechanism configured to recirculate at least part of a first exhaust gas discharged from the cathode during the pre-stop process as the first gas to the cathode.

The fuel cell system according to the seventh aspect enables the effective use of the first gas.

[Eighth Aspect]

The fuel cell system according to seventh aspect, wherein the first gas supply mechanism further comprises a fuel gas separating mechanism configured to separate the fuel gas from the first exhaust gas, and the fuel gas separated by the fuel gas separating mechanism is delivered to the cathode by the first gas circulation mechanism.

The fuel cell system according to the eighth aspect enables a greater amount of the fuel gas to be delivered to the cathode, thus efficiently increasing the partial pressure of the fuel gas in the cathode.

[Ninth Aspect]

The fuel cell system according to the eighth aspect, wherein the fuel gas separating mechanism comprises:

a second fuel cell structured to have an anode and a cathode provided across an electrolyte membrane; and a second power supply configured to apply a predetermined voltage to the second fuel cell, and wherein the controller is programmed to control the second power supply to apply the predetermined voltage to the second fuel cell, so as to separate the fuel gas from the first exhaust gas by the second fuel cell.

The fuel cell system according to the ninth aspect efficiently separates the fuel gas from the first exhaust gas by the electrochemical process.

[Tenth Aspect]

The fuel cell system according to either one of the first and second aspects, wherein the first gas supply mechanism comprises an anode supply mechanism configured to supply the first gas to the anode, and the controller is programmed to control the first gas supply mechanism to supply the first gas to the anode in addition to the cathode in the pre-stop process.

The fuel cell system according to the tenth aspect supplies the first gas of the same composition to the cathode and the anode and thereby enables the partial pressure difference between the remaining gases in the cathode and in the anode to readily achieve the first state or the second state.

[Eleventh Aspect]

The fuel cell system according to the tenth aspect, wherein the first gas supply mechanism further comprises an exhaust gas circulation mechanism configured to mix exhaust gases discharged from the cathode and the anode, out of the first gas supplied to the anode and the cathode, and recirculate the mixed exhaust gases as the first gas to the anode and the cathode.

The fuel cell system according to the eleventh aspect enables the effective use of the first gas.

[Twelfth Aspect]

The fuel cell system according to the eleventh aspect, further comprising:

an anode gas supply/exhaust system configured to supply and discharge the fuel gas to and from the anode during normal power generation of the first fuel cell; and a cathode gas supply/exhaust system configured to supply and discharge an oxidizing gas to and from the cathode during normal power generation of the first fuel cell, wherein the first gas is gas mixture obtained by mixing gases remaining in the anode gas supply/exhaust system and in the cathode gas supply/exhaust system, after the controller stops the supply of the fuel gas and the supply of the oxidizing gas by the anode gas supply/exhaust system and the cathode gas supply/exhaust system.

The fuel cell system according to the twelfth aspect uses the gases remaining in the anode gas supply/exhaust system and the cathode gas supply/exhaust system as the first gas and does not need to provide a separate gas from the reactive gases used during normal power generation, as the first gas.

[Thirteenth Aspect]

The fuel cell system according to the twelfth aspect, further comprising:

a potential processing mechanism configured to reduce an electrode potential of the cathode below a level before start of the pre-stop process, wherein the controller is programmed so that the controller controls the potential processing mechanism to reduce the electrode potential of the cathode to a specific condition below the level before start of the pre-stop process, before controlling the first gas supply mechanism to supply the first gas to the anode and the cathode.

The fuel cell system according to the thirteenth aspect prevents the cathode abnormal potential, which may be generated when the gases remaining in the cathode gas supply/exhaust system and the anode gas supply/exhaust system are recirculated as the first gas to the anode and to the cathode. The "abnormal potential" herein means the electrode potential of the cathode increasing above the level during normal power generation and reaching or exceeding a specific level where oxidation of the cathode component material proceeds.

[Fourteenth Aspect]

The fuel cell system according to the thirteenth aspect, wherein the potential processing mechanism comprises an anode remaining gas supply mechanism configured to supply an anode remaining gas remaining in the anode gas supply/exhaust system, and wherein the controller is programmed to control the anode remaining gas supply mechanism to deliver the anode remaining gas to the cathode and cause oxygen remaining in the cathode to be discharged out of the cathode, so as to achieve the specific condition.

The fuel cell system according to the fourteenth aspect effectively uses the anode remaining gas to reduce the electrode potential without requiring a separate gas for making oxygen remaining in the cathode discharged out of the cathode.

[Fifteenth Aspect]

The fuel cell system according to either one of the first and second aspects, further comprising:

an anode gas supply/exhaust system configured to supply and discharge the fuel gas to and from the anode during normal power generation of the first fuel cell;

a cathode gas supply/exhaust system configured to supply and discharge an oxidizing gas to and from the cathode during normal power generation of the first fuel cell; and a pressure regulator configured to regulate gas pressure in the anode gas supply/exhaust system, wherein the first gas supply mechanism comprises:

a bypass flow path configured to connect the anode gas supply/exhaust system with the cathode gas supply/exhaust system; and a first mechanism provided in the bypass flow path and configured to connect the bypass flow path when pressure in an anode gas supply/exhaust system side of the bypass flow path reaches or exceeds a preset level and to disconnect the bypass flow path when the pressure in the anode gas supply/exhaust system side of the bypass flow path does not reach or exceed the preset level, and wherein when controlling the first gas supply mechanism to deliver the first gas to the cathode, the controller is programmed so that the controller stops the supply of the oxidizing gas to the cathode by the cathode gas supply/exhaust system, while continuing the supply of the fuel gas by the anode gas supply/exhaust system, and the controller is programmed to control the pressure regulator to regulate the pressure of the anode gas supply/exhaust system to or above the preset level and thereby connect the bypass flow path, so as to introduce the fuel gas as the first gas through the bypass flow path into the cathode gas supply/exhaust system.

The fuel cell system according to the fifteenth aspect increases the pressure in the anode gas supply/exhaust system, thus readily delivering the fuel gas as the first gas to the cathode.

[Sixteenth Aspect]

The fuel cell system according to the fifteenth aspect, wherein the first mechanism is a relief valve.

The fuel cell system according to the sixteenth aspect simplifies the control in the pre-stop process.

The present invention may be implemented by diversity of aspects and embodiments, for example, a method of stopping the fuel cell system, a program causing the computer to perform the method, a storage medium in which the program is stored, and a vehicle equipped with the fuel cell system.

DETAILED DESCRIPTION

A. First Embodiment

A-1. Configuration of First Embodiment

Figure 1:
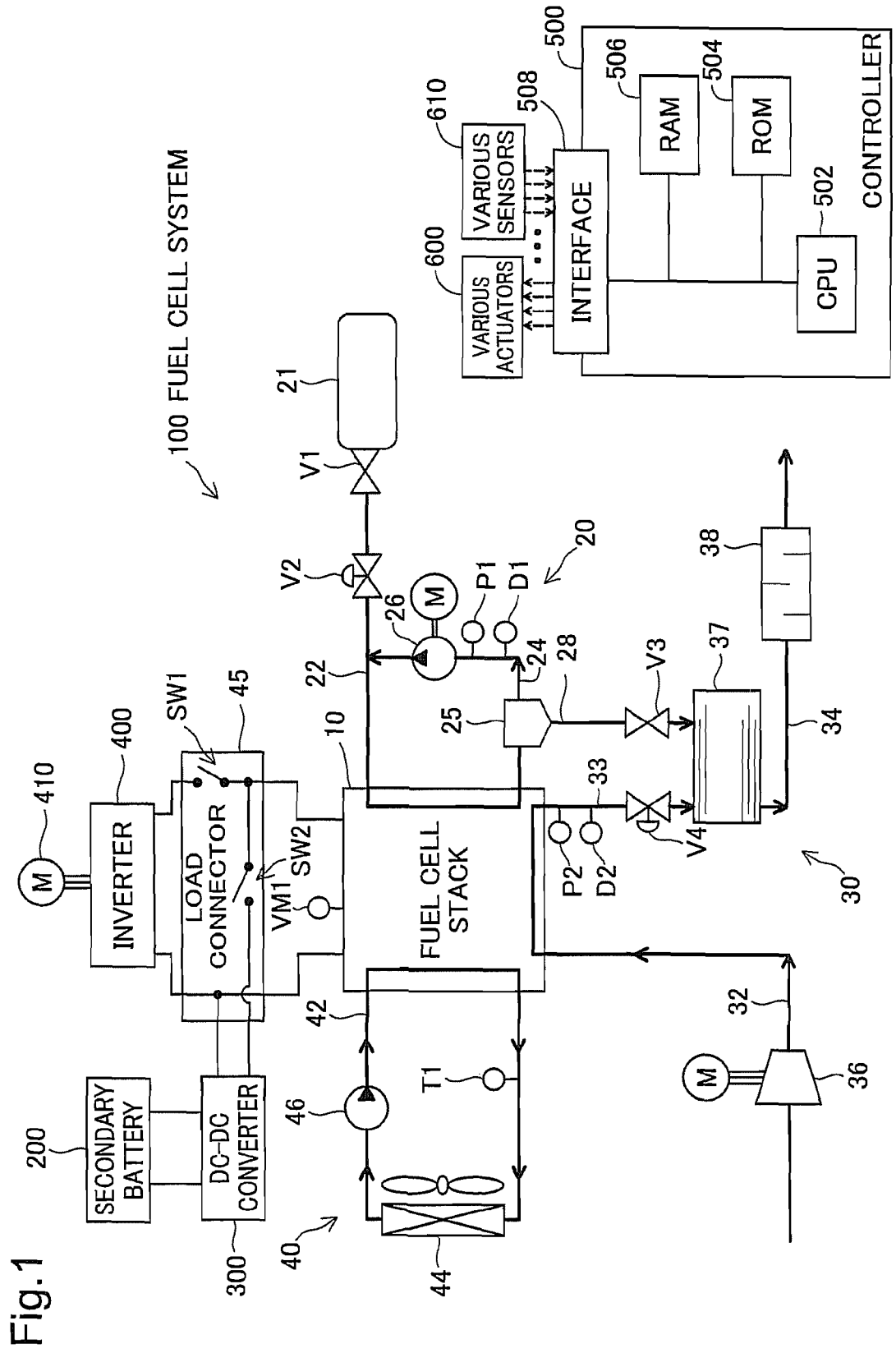
FIG. 1 illustrates the general configuration of an electric vehicle with a fuel cell system 100 according to a first embodiment of the invention.

FIG. 1 illustrates the general configuration of an electric vehicle with a fuel cell system 100 according to a first embodiment of the invention. As illustrated, the fuel cell system 100 mounted on the electric vehicle includes a fuel cell stack 10, fuel gas supply/exhaust system 20, oxidizing gas supply/exhaust system 30, cooling water system 40, a load connector 45, and a controller 500. The electric vehicle includes an inverter 400, a motor 410, a secondary battery 200 and a DC-DC converter 300, in addition to the fuel cell system 100.

The fuel cell stack 10 is structured by stacking a plurality of unit polymer electrolyte fuel cells that are relatively small in size and have excellent power generation efficiency. More specifically, the fuel cell stack 10 has the stacked structure of a plurality of unit cells, wherein each unit cell includes a pair of separators having flow paths for fuel gas, oxidizing gas and cooling water and an MEA (membrane electrode assembly) placed between the pair of separators. The MEA is structured to have a solid polymer electrolyte membrane (hereinafter also called "electrolyte membrane") placed between two electrodes, i.e., anode (fuel electrode) and cathode (air electrode).

The fuel cell stack 10 receives the supply of hydrogen as the fuel gas to the anode and the supply of the air as the oxidizing gas to the cathode and generates electric power through electrochemical reaction of hydrogen with oxygen in the air at the respective electrodes. The electric power generated by the fuel cell stack 10 is transferred to the inverter 400 to be converted into AC power and is then supplied to the motor 410 for vehicle driving. The secondary battery 200 is configured to accumulate electric power when there is excess power generated by the fuel cell stack 10 and to discharge electric power to the inverter 400 when there is insufficient power generation. The secondary battery 200 may also be used as an external power source to apply a voltage to the fuel cell stack 10. A plurality of voltage sensors VM1 are attached to the fuel cell stack 10 to detect the voltages of the respective unit cells. The fuel cell stack 10 herein corresponds to the "first fuel cell" described in "Solution to Problem" section.

The anode includes an anode catalyst layer and an anode gas diffusion layer formed in this sequence on one surface of the polymer electrolyte membrane. Similarly, the cathode includes a cathode catalyst layer and a cathode gas diffusion layer formed in this sequence on the other surface of the polymer electrolyte membrane. The anode catalyst layer and the cathode catalyst layer are made of a catalyst-supported material and may be, for example, made of the mixture of carbon black supporting platinum as the catalyst and a polymer electrolyte. The anode gas diffusion layer and the cathode gas diffusion layer are made of a material having gas permeability and good electrical conductivity. Such material may be, for example, carbon paper or carbon cloth.

The fuel gas supply/exhaust system 20 serves to supply hydrogen as the fuel gas to the fuel cell stack 10, while serving to recirculate the exhaust fuel gas from the fuel cell stack 10 to the anode and to discharge the exhaust fuel gas out of the fuel cell system 100.

The fuel gas supply/exhaust system 20 mainly includes a fuel gas supply source (fuel gas tank) 21, a fuel gas supply pipe 22, a fuel gas circulation pipe 24 and a fuel gas exhaust pipe 28. The fuel gas tank 21 is structured to store high-pressure fuel gas. The fuel gas tank 21 has a shutoff valve V1. The fuel gas supply pipe 22 has one end connected to the fuel gas tank 21 and the other end connected to the fuel cell stack 10 (more specifically, a fuel gas supply port (not shown) of the fuel cell stack 10). The fuel gas supply port of the fuel cell stack 10 communicates with inner-unit cell fuel gas flow paths via a manifold (not shown) formed in the fuel cell stack 10.

A pressure regulator V2 is provided in the fuel gas supply pipe 22. The shutoff valve V1 is opened and closed in response to the instructions from the controller 500, so that the fuel gas tank 21 starts and stops releasing the fuel gas to the fuel gas supply pipe 22. The fuel gas released from the fuel gas tank 21 to the fuel gas supply pipe 22 is subjected to pressure regulation by the pressure regulator V2 to a preset pressure level and is then supplied to the fuel cell stack 10.

The fuel gas circulation pipe 24 has one end connected to a fuel gas discharge port (not shown) of the fuel cell stack 10 and the other end connected to the fuel gas supply pipe 22. A pressure sensor P1, a hydrogen concentration sensor D1, a gas-liquid separator 25, and a fuel gas circulation pump 26 are provided in the fuel gas circulation pipe 24. The pressure sensor P1 measures the internal pressure of the fuel gas circulation pipe 24. The hydrogen concentration sensor D1 measures the concentration of hydrogen included in the recirculated gas present in the fuel gas circulation pipe 24. According to this embodiment, the internal pressure measured by the pressure sensor P1 and the hydrogen concentration measured by the hydrogen concentration sensor D1 are used respectively as the pressure in the anode (hereinafter called "anode total pressure") of the fuel cell stack 10 and as the hydrogen concentration in the anode for a pre-stop process as described later. The exhaust fuel gas discharged from the anode is introduced into the fuel gas supply pipe 22 by operating the fuel gas circulation pump 26 and is thereby reused as the fuel gas for the electrochemical reaction in the fuel cell stack 10. The gas-liquid separator 25 serves to remove excess water content included in the exhaust fuel gas and regenerate the exhaust fuel gas into the fuel gas to be supplied.

The fuel gas exhaust pipe 28 is used to discharge part of the exhaust fuel gas from the fuel cell stack 10 out of the fuel cell system 100. The fuel gas exhaust pipe 28 has one end connected to the gas-liquid separator 25 and the other end connected to a diluter 37 described later. An exhaust valve V3 is provided in the fuel gas exhaust pipe 28. The exhaust valve V3 is normally closed and is opened at preset timing to introduce the exhaust fuel gas into the diluter 37. The exhaust fuel gas introduced into the diluter 37 then flows out through a piping 34 and a muffler 38. Discharging part of the exhaust fuel gas out of the fuel cell system 100 prevents an increase in concentration of the impurities (e.g., nitrogen in the air moving from the cathode to the anode across the electrolyte membrane) included in the exhaust fuel gas recirculated to the fuel cell stack 10. The exhaust valve V3 is also opened and closed to regulate the anode gas partial pressure or the anode total pressure in the pre-stop process described later.

The oxidizing gas supply/exhaust system 30 serves to supply the air as the oxidizing gas to the fuel cell stack 10, while serving to discharge the exhaust oxidizing gas from the fuel cell stack 10 out of the fuel cell system 100.

The oxidizing gas supply/exhaust system 30 mainly includes an oxidizing gas supply pipe 32 and an oxidizing gas exhaust pipe 33. The oxidizing gas supply pipe 32 has one end open to the atmosphere outside the fuel cell system 100 and the other end connected to the fuel cell stack 10 (more specifically, an oxidizing gas supply port (not shown) of the fuel cell stack 10). The oxidizing gas supply port of the fuel cell stack 10 communicates with inner-unit cell oxidizing gas flow paths via a manifold (not shown) formed in the fuel cell stack 10.

An air compressor 36 is provided in the oxidizing gas supply pipe 32. The air compressor 36 compresses the oxidizing gas (air) intake via an air cleaner (not shown) into the oxidizing gas supply pipe 32. The compressed oxidizing gas is supplied to the fuel cell stack 10.

The oxidizing gas exhaust pipe 33 has one end connected to an oxidizing gas discharge port (not shown) of the fuel cell stack 10 and the other end connected to the diluter 37. A pressure sensor P2, a hydrogen concentration sensor D2 and a valve V4 are provided in the oxidizing gas exhaust pipe 33. The pressure sensor P2 measures the internal pressure of the oxidizing gas exhaust pipe 33. The hydrogen concentration sensor D2 measures the concentration of hydrogen included in the exhaust oxidizing gas in the oxidizing gas exhaust pipe 33. According to this embodiment, the internal pressure measured by the pressure sensor P2 and the hydrogen concentration measured by the hydrogen concentration sensor D2 are used respectively as the pressure in the cathode (hereinafter called "cathode total pressure") of the fuel cell stack 10 and as the hydrogen concentration in the cathode for the pre-stop process described later. The exhaust oxidizing gas from the cathode flows through the oxidizing gas exhaust pipe 33 and is introduced into the diluter 37.

The diluter 37 mixes the exhaust oxidizing gas with the exhaust fuel gas introduced into the diluter 37 at the preset timing to prepare the exhaust gas mixture. This dilutes hydrogen included in the exhaust fuel gas and thereby reduces the concentration of hydrogen in the exhaust gas mixture. The exhaust gas mixture from the diluter 37 flows through the piping 34 and the muffler 38 and is discharged out of the fuel cell system 100.

The supply amount of the oxidizing gas to the fuel cell stack 10 is adjusted by controlling the rotation speed of the air compressor 36 and the open-close setting of the valve V4 by means of the controller 500.

The cooling water system 40 serves to supply cooling water as a coolant to the fuel cell stack 10 and thereby maintain the temperature of the fuel cell stack 10 at an adequate level. The cooling water system 40 includes a cooling water pipe 42 and a radiator 44. A circulation pump 46 and a temperature sensor T1 are provided in the cooling water pipe 42. The cooling water is circulated between the fuel cell stack 10 and the radiator 44 through the cooling water pipe 42 by means of the circulation pump 46. The cooling water accordingly absorbs heat generated by the electrochemical reaction in the fuel cell stack 10 and releases the absorbed heat in the radiator 44. The temperature sensor T1 is provided in the cooling water pipe 42 in the vicinity of the cooling water discharge position from the fuel cell stack 10. The temperature sensor T1 measures the temperature of cooling water. The measured temperature of cooling water is used as the temperature of the power generation assembly in the fuel cell stack 10 for the pre-stop process described later.

The load connector 45 is provided as a device to control on and off switches SW1 and SW2 in response to the instructions from the controller 500 and thereby make electrical connections with the secondary battery 200, the inverter 400 and the fuel cell stack 10.

The controller 500 receives signals from various sensors 610 and information on a load request to the fuel cell stack 10, outputs drive signals to various actuators 600 and controls the operations of the whole fuel cell system 100. The controller 500 is structured as a microcomputer-based logic circuit. The controller 500 includes a CPU 502, a ROM 504, a RAM 506 and an interface 508. The CPU 502 performs specified operations according to a preset control program. The ROM 504 stores control programs, control data and the like required for the various operations performed by the CPU 502. Various data required for the various operations performed by the CPU 502 are temporarily written in and read out from the RAM 506. The interface 508 connects the various actuators 600 and the various sensors 610 with the controller 500 via control signal lines. Specific examples of the various actuators 600 include the shutoff valve V1, the pressure regulator V2, the fuel gas circulation pump 26, the exhaust valve V3, the valve V4, the air compressor 36 and the load connector 45. Specific examples of the various sensors 610 include the pressure sensors P1 and P2, the hydrogen concentration sensors D1 and D2, the temperature sensor T1 and the voltage sensors VM1.

The controller 500 controls the operations of the whole electric vehicle as well as the operations of the fuel cell system 100, and outputs control signals to the DC-DC converter 300 and the inverter 400.

During normal power generation of the fuel cell stack 10, the shutoff valve V1 and the pressure regulator V2 are opened to supply hydrogen to the anode, whilst the fuel gas circulation pump 26 is operated to introduce the exhaust fuel gas into the fuel gas supply pipe 22 and reuse the exhaust fuel gas. The air compressor 36 is also operated to supply the oxidizing gas to the cathode, whilst the valve V4 is opened to discharge out the exhaust oxidizing gas. The circulation pump 46 is also operated to circulate and deliver cooling water through the fuel cell stack. During the normal power operation, the switches SW1 and SW2 of the load connector 45 are set ON to supply the generated electric power to at least the inverter 400. The term "during normal power generation" herein means the state in which the fuel cell stack 10 constantly generates electric power with specified amounts of the fuel gas and the oxidizing gas supplied to the fuel cell stack 10 and supplies the generated electric power to the external load, such as the inverter 400. During system stop, power generation of the fuel cell stack stops with no supplies of the fuel gas and the oxidizing gas to the fuel cell stack 10, whilst the circulation of cooling water and the recirculation of the exhaust fuel gas by the fuel gas circulation pump 26 are terminated, accompanied with power-off of the whole system. The term "power generation of the fuel cell stack stops" herein means the state in which the electrical connections with the secondary battery 200 and the inverter 400 as the external load are disconnected to interrupt output of electric power to the external load.

A-2. Pre-Stop Process of First Embodiment

A-2-1. First Aspect of Pre-Stop Process

Figure 2:
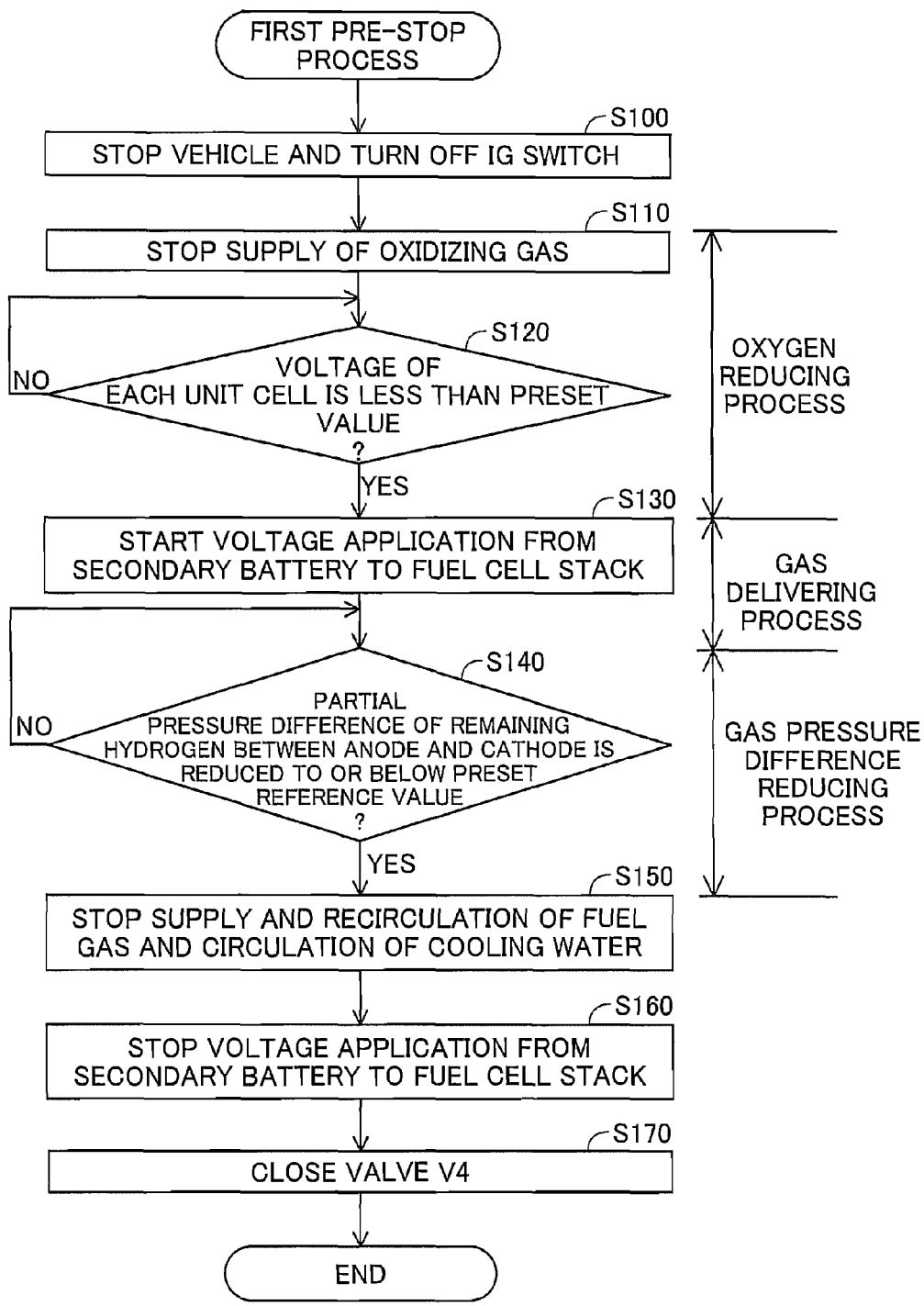
FIG. 2 is a flowchart showing a first aspect of pre-stop process.

FIG. 2 is a flowchart showing a first aspect of pre-stop process (hereinafter called "first pre-stop process") performed by the controller 500 according to the first embodiment. When the user stops the vehicle and turns OFF its ignition switch (hereinafter also called "IG switch"), an IG switch OFF signal is input into the controller 500 (step S100). Before the pre-stop process, nitrogen and oxygen mainly remain in the cathode, while hydrogen and nitrogen mainly remain in the anode. In the application using the air as the oxidizing gas, the mole fractions of nitrogen and oxygen in the gas remaining in the cathode may be respectively equal to, for example, about 0.8 and about 0.2 after the stop of normal operation. Nitrogen accordingly has the higher concentration and the higher partial pressure than oxygen in this state. The mole fractions of nitrogen and hydrogen in the gas remaining in the anode may be respectively equal to, for example, about 0.2 and about 0.8. Hydrogen accordingly has the higher concentration and the higher partial pressure than nitrogen in this state. The other pre-stop processes described in the specification hereof are also on the assumption of the similar gas concentrations and the similar gas partial pressures in the anode and in the cathode before the pre-stop process. In the first pre-stop process, when receiving the IG switch OFF signal, the controller 500 turns OFF the switch SW1 of the load connector 45 and disconnects the electrical connection with the inverter 400. In this state, the switch SW2 is kept ON.

After step S100, the controller 500 stops operation of the air compressor 36 to stop the supply of the oxidizing gas to the cathode (step S110). The supply of the fuel gas to the anode via the fuel gas tank 21 and the fuel gas circulation pump 26, however, continues at step S110. Operating the fuel cell stack 10 to generate electric power in the state of step S110 reduces the concentration of oxygen in the oxidizing gas remaining in the cathode to be lower than the oxygen level during normal power generation. The electric power generated in this state is accumulated in the secondary battery 200.

The controller 500 subsequently determines whether the voltage of each unit cell is less than a preset value, based on the signal from the voltage sensor VM1 (step S120). The preset value herein represents a voltage value obtained when the concentration of oxygen remaining in the cathode is equal to or below a specific concentration level (concentration value when oxygen is sufficiently consumed). In a specific example, it is determined whether each unit cell voltage is less than 0.05 V (each unit cell voltage during normal power generation is about 0.7 V). The mode in which the fuel cell stack 10 is operated to generate electric power with stopping the supply of the oxidizing gas but continuing the supply of the fuel gas herein corresponds to the "first drive mode" described in Solution to Problem section. The process of reducing the concentration of oxygen in the cathode prior to gas delivering process (described later), i.e., steps S110 and S120, is called "oxygen reducing process".

According to this embodiment, one procedure of determining whether a preset condition is satisfied based on the voltage value may determine whether any one of a plurality of unit cells satisfies the preset condition. Another procedure may classify a plurality of unit cells into multiple groups and determine whether each group satisfies the preset condition, based on the mean value of the group. Yet another procedure may determine whether the preset condition is satisfied, based on the voltage value of an arbitrary unit cell among a plurality of unit cells. Another procedure may determine whether the preset condition is satisfied, based on the overall output voltage of the fuel cell stack.

When it is determined that each unit cell voltage is not less than the preset value (step S120: No), the controller 500 continues the first drive mode. When it is determined that each unit cell voltage is less than the preset value (step S120: Yes), on the other hand, the controller 500 controls the DC-DC converter 300 to start applying a voltage from the secondary battery 200 to the fuel cell stack 10 (step S130). More specifically, a voltage of such a level as to accelerate the hydrogen electrode reaction is applied to the fuel cell stack 10, and DC current is flowed from the cathode to the anode via an external circuit including the secondary battery 200. Hydrogen is accordingly ionized to produce hydrogen ion at the anode of the fuel cell stack 10, and the produced hydrogen ion moves to the cathode across the electrolyte membrane. At the cathode, hydrogen atom is produced by the reaction of the hydrogen ion with the electron supplied from the secondary battery 200. Moving hydrogen from the anode to the cathode by applying a voltage from the external power source to the fuel cell stack 10 is called "hydrogen pumping effect". The hydrogen delivered to the cathode by the hydrogen pumping effect causes the nitrogen remaining in the cathode to be discharged out of the fuel cell stack 10 (i.e., downstream of the valve V4). This decreases the nitrogen partial pressure and increases the hydrogen partial pressure at the cathode. The process of delivering the hydrogen-containing gas to the cathode, i.e., step S130, is called "gas delivering process". The secondary battery 200 and the DC-DC converter 300 herein correspond to the "first power supply" described in Solution to Problem section. According to this embodiment, the mechanism of delivering hydrogen to the cathode by the hydrogen pumping effect (secondary battery 200, DC-DC converter 300, load connector 45, fuel gas supply pipe 22 and fuel gas tank 21) herein corresponds to the "first gas supply mechanism" described in Solution to Problem section.

After step S130, the controller 500 determines whether the partial pressure difference between the hydrogen partial pressures present (remaining) in the anode and in the cathode is reduced to or below a preset reference value (step S140). The partial pressures in the anode and in the cathode and the partial pressure difference are calculated by the controller 500 from the signals on the anode total pressure and the cathode total pressure output from the pressure sensors P1 and P2 and the signals on the hydrogen concentrations in the anode and in the cathode output from the hydrogen concentration sensors D1 and D2.

The reference value for the hydrogen partial pressure difference may be set according to the following procedure. The reference value should be set to prevent the migration of hydrogen between the two electrodes due to the partial pressure difference, which may vary the cathode total pressure and generate the negative pressure in the cathode, and thereby prevent the inflow of the atmosphere from outside the fuel cell system 100 during a period of time between stop of the fuel cell system 100 and restart of the fuel cell system 100 (i.e., during system stop). By taking into account the type of the vehicle with the fuel cell system 100 and the system stop period, this reference value may be set in a range that gives the smaller partial pressure difference than the partial pressure difference before start of the pre-stop process. For example, the reference value for the hydrogen partial pressure difference is preferably set in a range from 0 to 30 Kpa. The process of reducing the partial pressure difference of a gas component between the two electrodes to or below a preset reference value, i.e., step S140, is also called "gas pressure difference reducing process". In order to complete the processing of step S140 within a shorter period of time, it is preferable that the controller 500 controls the open-close setting of the exhaust valve V3 and the supply amount of the fuel gas by the pressure regulator V2 to prevent a significant variation in hydrogen partial pressure at the anode during the gas delivering process and the gas pressure difference reducing process.

When it is determined that the partial pressure difference between the hydrogen partial pressures in the two electrodes is not reduced to or below the preset reference value (step S140: No), the gas delivering process continues until the hydrogen partial pressure difference between the two electrodes is reduced to or below the preset reference value. When it is determined that the hydrogen partial pressure difference between the two electrodes is reduced to or below the preset reference value (step S140: Yes), on the other hand, the controller 500 closes the valves V1 and V2 and stops the operation of the circulation pump 46 and the fuel gas circulation pump 26 to stop the supply and recirculation of the fuel gas and the circulation of the cooling water (step S150). The controller 500 also stops the voltage application from the secondary battery 200 to the fuel cell stack 10 and turns OFF the switch SW2 (step S160) and closes the valve V4 (step S170). This completes the pre-stop process and stops the system. The processing of steps S150 and S160 may be performed in no particular order but at any arbitrary timing. The operation of the fuel gas circulation pump is stopped at step S150 according to the above embodiment but may alternatively be stopped at any other timing of or after step S110 (e.g., at the timing of step S110). The circulation of cooling water is stopped at step S150 according to the above embodiment, but the circulation of cooling water may be started and stopped at any other timing to keep the temperature of the fuel cell stack 10 at the adequate level.

At the time of stopping the fuel cell system 100, the pre-stop process is performed to deliver hydrogen to the cathode and reduce the hydrogen partial pressure difference between the two electrodes to or below the preset reference value, so as to prevent permeation of hydrogen through the electrolyte membrane by the hydrogen partial pressure difference as the driving force. This reduces a variation of the cathode total pressure and prevents negative pressure in the cathode. This accordingly prevents introduction of the air from outside the fuel cell system 100 into the cathode and inhibits oxidation of the cathode component material (e.g., carbon used for the cathode gas diffusion layer or the cathode catalyst layer) after the system stop.

There is no need to use a valve of the high sealing property (e.g., shutoff valve) for the valve V4 provided in the oxidizing gas exhaust pipe 33, since the pre-stop process is performed to prevent negative pressure in the cathode after the system stop. This allows cost reduction of the fuel cell system. A valve with lower sealing property, such as a back pressure valve or a butterfly valve, may be used for the valve V4.

Delivering hydrogen to the cathode by the hydrogen pumping effect enables hydrogen to be evenly distributed over the whole area of the cathode across the electrolyte membrane. This advantageously reduces a variation of the hydrogen concentration in the cathode of each unit cell.

The oxygen reducing process (steps S110 and S120) is performed prior to the gas delivering process (step S130). This prevents hydrogen delivered to the cathode from reacting with oxygen and combusting on the cathode catalyst, thereby preventing the performance degradation of the fuel cell stack 10.

Closing the valve V4 at step S179 prevents introduction of the diffused air from outside the fuel cell system 100 into the cathode, thus effectively inhibiting oxidation of the cathode component material.

According to a more preferable procedure of the first pre-stop process, the controller 500 may calculate the hydrogen partial pressures in the two electrodes from the signals available for calculation of the hydrogen partial pressures (e.g., total pressures and hydrogen concentrations) at step S140. The controller 500 may also determine whether the hydrogen partial pressure difference between the two electrodes is reduced to be approximately zero, based on the calculated partial pressures. This is equivalent to determine whether the hydrogen partial pressures in the two electrodes are substantially equal to each other. When the hydrogen partial pressure difference between the two electrodes is reduced to be approximately zero, the controller 500 performs the process of and after step S150. This prevents permeation of hydrogen through the electrolyte membrane due to the hydrogen partial pressure difference and thereby reduces the variation of the cathode total pressure. This preferable procedure is similarly applicable to the gas pressure difference reducing process in each of the other pre-stop processes described later.

A-2-2. Second Aspect of Pre-Stop Process

Figure 3:
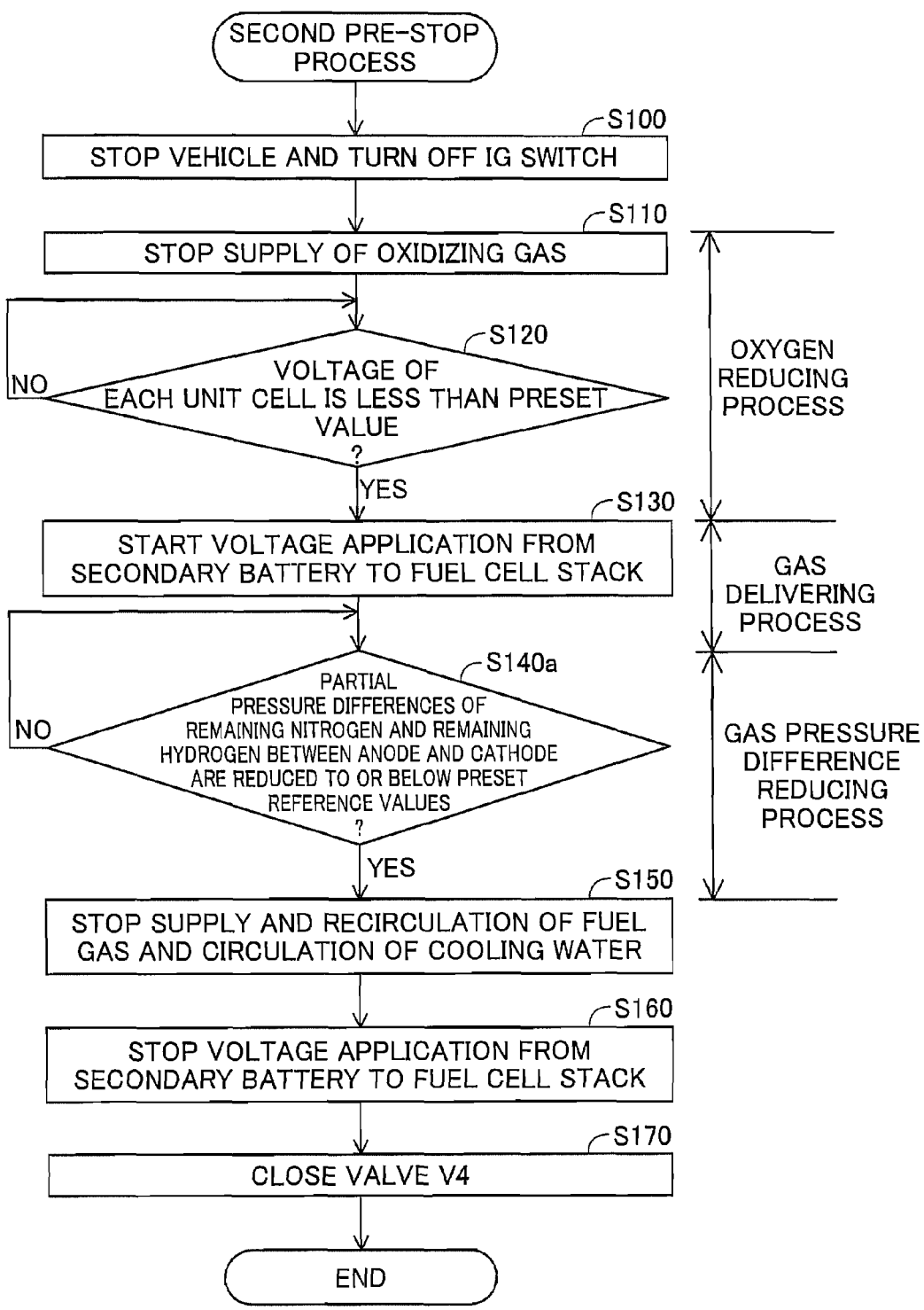
FIG. 3 is a flowchart showing a second aspect of pre-stop process.

FIG. 3 is a flowchart showing a second aspect of pre-stop process (hereinafter called "second pre-stop process") performed by the controller 500 according to the first embodiment. The second pre-stop process differs from the first pre-stop process by replacement of step S140 with step S140a but is otherwise similar to the first pre-stop process. The like steps to those of the first pre-stop process are shown by the like step numbers and are not specifically described here. During the second pre-stop process, the operations of the valves V1, V2 and V3 in the fuel gas supply/exhaust system 20 are controlled, in order to make the anode total pressure and the cathode total pressure substantially equal to each other (e.g., atmospheric pressure level). For example, when the anode total pressure becomes higher than the atmospheric pressure during the gas delivering process, the exhaust valve V3 may be opened to reduce the anode total pressure.

At step S140a, the controller 500 determines whether the partial pressure differences of the (remaining) hydrogen component and nitrogen component between the anode and the cathode are respectively reduced to or below preset reference values. According to this aspect, since nitrogen and hydrogen are the remaining gases in the two electrodes during the gas pressure difference reducing process, the controller 500 calculates the nitrogen partial pressures and the hydrogen partial pressures in the two electrodes from the signals on the total pressures and the hydrogen concentrations and determines the partial pressure differences from the calculated partial pressures. The nitrogen partial pressure difference may be determined by using nitrogen concentration sensors provided in the oxidizing gas exhaust pipe 33 and in the fuel gas circulation pipe 24.

The reference value for the hydrogen partial pressure difference (hereinafter also called "first preset reference value") may be set in the similar way to that in the first pre-stop process. The reference value for the nitrogen partial pressure difference (hereinafter also called "second preset reference value") may be set in a range that prevents the migration of nitrogen between the two electrodes by the nitrogen pressure difference between the two electrodes as the driving force. In other words, the reference value may be set to prevent the inflow of the atmosphere from outside the fuel cell system 100 due to a variation of the cathode total pressure and generation of negative pressure in the cathode during system stop. In the same manner as the method of setting the reference value for the hydrogen partial pressure difference, the reference value for the nitrogen partial pressure difference may be set in a range that gives the smaller partial pressure difference than the partial pressure difference before start of the pre-stop process by taking into account the type of the vehicle with the fuel cell system 100 and the system stop period. For example, the reference value for the nitrogen partial pressure difference is preferably set in a range from 0 to 30 Kpa. Nitrogen has the smaller permeation coefficient to the electrolyte membrane and is less likely to permeate through the electrolyte membrane than hydrogen. By considering this characteristic, a greater value may be set to the reference value for the nitrogen partial pressure difference than the reference value for the hydrogen partial pressure difference.

As described above, the second pre-stop process reduces the nitrogen partial pressure difference, as well as the hydrogen partial pressure difference between the two electrodes to or below the respective preset reference values (step S140a). This further reduces the variation of the cathode total pressure and more effectively prevents negative pressure in the cathode. This accordingly prevents introduction of the air from outside the fuel cell system 100 into the cathode and inhibits oxidation of the cathode component material after the system stop. The second pre-stop process additionally has the same advantageous effects as those of the first pre-stop process described above.

According to a more preferable procedure of the second pre-stop process, the controller 500 may calculate the hydrogen partial pressures and the nitrogen partial pressures in the two electrodes from the signals available for calculation of the hydrogen partial pressures and the nitrogen partial pressures (e.g., total pressures and hydrogen concentrations) at step S140a. The controller 500 may also determine whether the hydrogen partial pressure difference and the nitrogen partial pressure difference between the two electrodes are both reduced to be approximately zero, based on the calculated partial pressures. This is equivalent to determine whether the hydrogen partial pressures and the nitrogen partial pressures in the two electrodes are both substantially equal to each other. When the hydrogen partial pressure difference and the nitrogen partial pressure difference between the two electrodes are both reduced to be approximately zero, the controller 500 performs the process of and after step S150. This more effectively reduces the variation of the cathode total pressure. This preferable procedure is similarly applicable to the gas pressure difference reducing process in each of the other pre-stop processes described later.

A-3. Modifications of First Embodiment

A-3-1. First Modification

The oxygen reducing process (steps S110 and S120) may be omitted from the first and second pre-stop processes. Even in the application with such omission, the gas pressure difference reducing process (step S140 or step S140a) can reduce the variation of the cathode total pressure after the system stop.

The operation of the fuel gas circulation pump 26 continues at step S110, but may alternatively be stopped.

A-3-2. Second Modification

The valve V4 is provided in the oxidizing gas exhaust pipe 33 in the structure of the fuel cell system 100 (FIG. 1), but may be omitted. Even in the structure with such omission, the pre-stop process can prevent negative pressure in the cathode and the resulting introduction of the air from outside the system into the cathode, thus inhibiting oxidation of the cathode component material.

A-3-3. Third. Modification

The air is used for the oxidizing gas according to the above embodiment, but pure oxygen may be used alternatively. In this case, the gas components remaining in the cathode and in the anode do not include nitrogen but include only hydrogen. There is accordingly no need to consider the variation of the total cathode pressure by the partial pressure difference of another gas component (e.g., nitrogen) as the driving force. In this case, the second pre-stop process (FIG. 3) determines whether the partial pressure difference of the remaining hydrogen between the two electrodes (i.e., the total pressure difference between the two electrodes) is reduced to or below the preset reference value at step S140a, in the same manner as the determination at step S140 in the first pre-stop process (FIG. 2).

A-3-4. Fourth Modification

The oxygen reducing process (steps S110 and S120) determines the oxygen reduction, based on the voltage as the criterion in the first and second pre-stop processes, but this is not essential. In another application, an oxygen concentration sensor may be provided in the oxidizing gas exhaust pipe 33 (FIG. 1), and the oxygen reducing process may determine the oxygen reduction, based on whether the measurement value of the oxygen concentration sensor is reduced to or below a preset level.

B. Second Embodiment

B-1. Configuration of Second Embodiment

Figure 4:
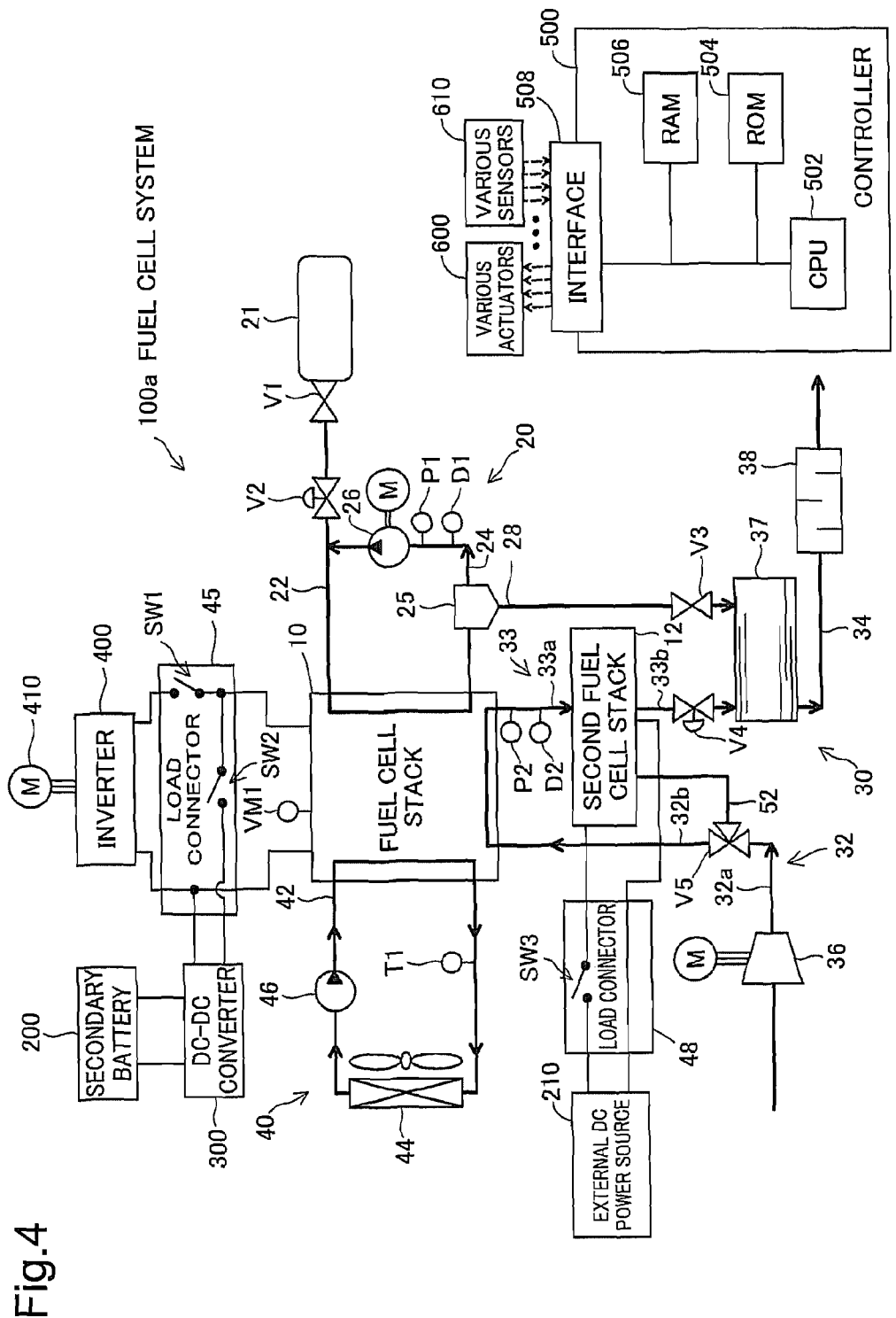
FIG. 4 illustrates the general configuration of an electric vehicle with a fuel cell system 100a according to a second embodiment of the invention.

FIG. 4 illustrates the general configuration of an electric vehicle with a fuel cell system 100a according to a second embodiment of the invention. The difference from the first embodiment includes a mechanism of recirculating the exhaust gas that is discharged from the oxidizing gas discharge port of the fuel cell stack 10 to the oxidizing gas exhaust pipe 33 (hereinafter also called "first exhaust gas"), to the cathode as the first gas during the pre-stop process, in addition to the structures of the first embodiment. Otherwise the second embodiment has the similar configuration to that of the first embodiment. The like structures to those of the first embodiment are shown by the like symbols and are not specifically described here.

The fuel cell system 100a of the second embodiment additionally includes a second fuel cell stack 12, an external DC power source 210, a load connector 48, an exhaust gas return pipe 52 and a three-way valve V5. The second fuel cell stack 12 has the similar structure to that of the fuel cell stack 10, except that the second fuel cell stack 12 does not have a cathode supply port for supplying the oxidizing gas. The second fuel cell stack 12 is not provided as a device to supply the generated electric power as explained below and may accordingly have a less number of stacked unit cells, compared with the fuel cell stack 10. The second fuel cell stack 12 and the external DC power source 210 herein respectively correspond to the "second fuel cell" and the "second power supply" described in Solution to Problem section.

The second fuel cell stack 12 serves to separate hydrogen from the first exhaust gas containing nitrogen and hydrogen and flowing through the oxidizing gas exhaust pipe 33. An exhaust gas supply port and an exhaust gas discharge port connecting with the anode of the second fuel cell stack 12 (hereinafter called "second anode") are provided in the second fuel cell stack 12. A separated gas discharge port connecting with the cathode of the second fuel cell stack 12 (hereinafter called "second cathode") is also provided in the second fuel cell stack 12. The exhaust gas supply port is connected with an upstream pipe 33a or an upstream section of the oxidizing gas exhaust pipe 33. The exhaust gas discharge port is connected with a downstream pipe 33b or a downstream section of the oxidizing gas exhaust pipe 33. The separated gas discharged port of the second fuel cell stack 12 is connected with the exhaust gas return pipe 52. In the specification hereof, the upstream and the downstream are on the basis of the flow direction of the reactive gases and the coolant flowing in the fuel cell system during normal power generation.

The three-way valve V5 is provided at the joint between the exhaust gas return pipe 52 and the oxidizing gas supply pipe 32. The controller 500 controls the port open-close setting of the three-way valve V5 to change the connection state of the exhaust gas return pipe 52 and the oxidizing gas supply pipe 32. An upstream section of the oxidizing gas supply pipe 32 in the upstream of the three-way valve V5 is called upstream pipe 32a, and a downstream section in the downstream of the three-way valve V5 is called downstream pipe 32b.

The external DC power source 210 serves to apply a voltage to the second fuel cell stack 12 and cause the hydrogen pumping effect in the second fuel cell stack 12. The external DC power source 210 may be, for example, a combined device of a secondary battery and a DC-DC converter. The load connector 48 is provided as a device to connect the external DC power source 210 with the second fuel cell stack 12 by the instruction from the controller 500 and includes a switch SW3. The external DC power source 210 may be replaced by the secondary battery 200 and the DC-DC converter 300 to apply a voltage to the fuel cell stack 10.

B-2. Pre-Stop Process of Second Embodiment

Figure 5:
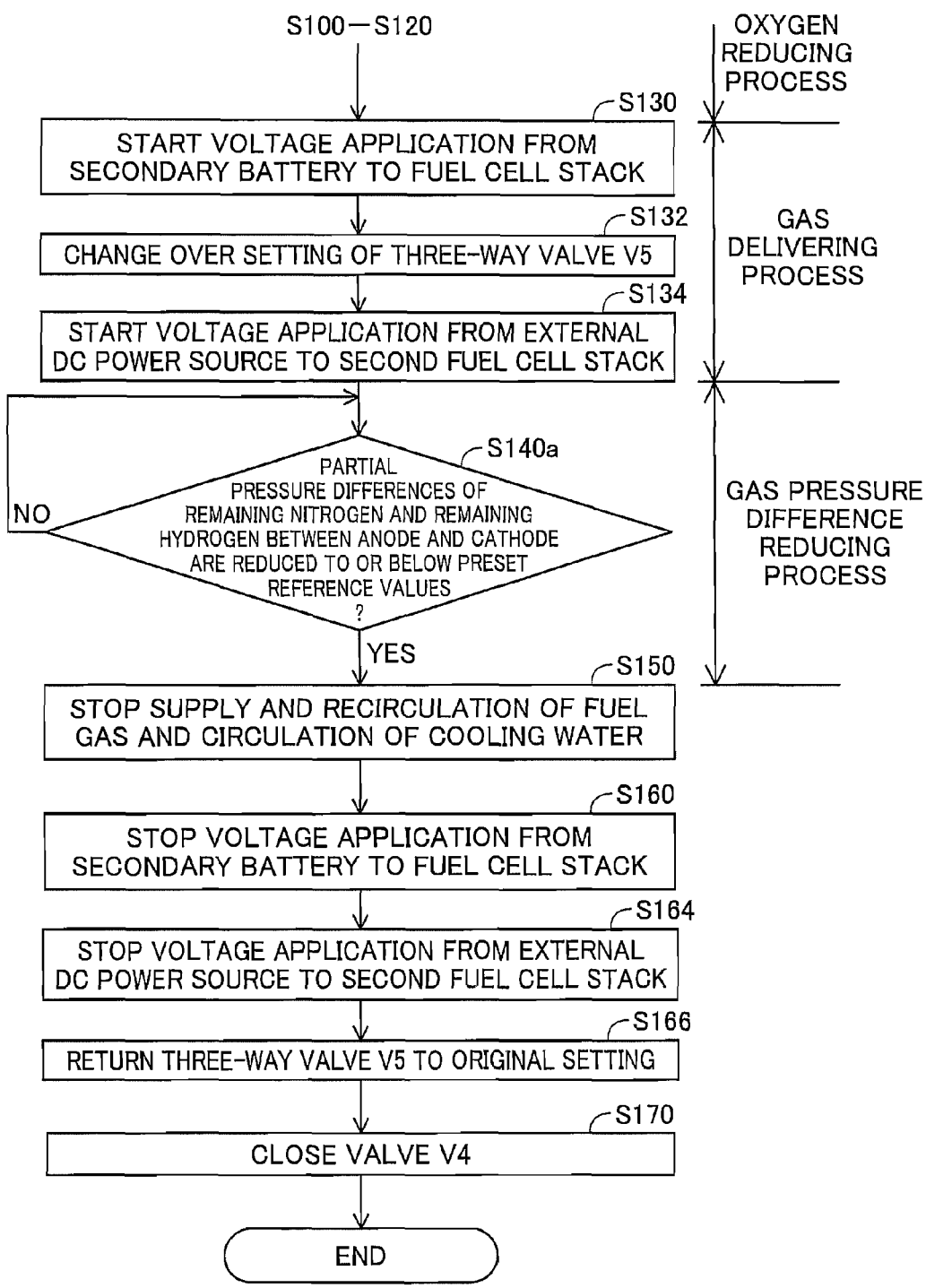
FIG. 5 is a flowchart showing a third aspect of pre-stop process.

FIG. 5 is a flowchart showing a third aspect of pre-stop process (hereinafter called "third pre-stop process") performed by the controller 500 according to the second embodiment. The difference from the second pre-stop process (FIG. 3) includes separating hydrogen from the first exhaust gas flowing through the oxidizing gas exhaust pipe 33 and recirculating the separated hydrogen as the first gas to the cathode in the gas delivering process. Otherwise the third pre-stop process is similar to the second pre-stop process. The like steps are shown by the like step numbers and are not specifically described here. Like the second pre-stop process, during the third pre-stop process, the operations of the valves V1, V2 and V3 are controlled, in order to make the anode total pressure and the cathode total pressure substantially equal to each other (e.g., atmospheric pressure level) in the fuel cell stack 10.

After starting the gas delivering process at step S130, the controller 500 changes over the port open-close setting of the three-way valve V5 (step S132). This makes the exhaust gas return pipe 52 communicate with the downstream pipe 32b to form a first gas circulation path (step S132). The controller 500 subsequently turns ON the switch SW3 of the load connector 48, while controlling the external DC power source 210 to start voltage application from the external DC power source 210 to the second fuel cell stack 12 (step S134). Hydrogen as one gas component of the first exhaust gas introduced to the second anode of the second fuel cell stack 12 via the oxidizing gas exhaust pipe 33 moves to the second cathode by the electrochemical reaction. In other words, hydrogen is separated from the first exhaust gas by taking advantage of the hydrogen pumping effect. The hydrogen moving to the second cathode is recirculated as the first gas to the cathode of the fuel cell stack 10 via the exhaust gas return pipe 52 and the downstream pipe 32b. The gas component (mainly nitrogen) other than hydrogen of the first exhaust gas flows through the pipe 33b and the piping 34 and is discharged out of the fuel cell system 100a. The processing of steps S130 to S134 may be performed in no particular order but at any arbitrary timing. The mechanism of delivering hydrogen to the cathode of the second fuel cell stack 12 by taking advantage of the hydrogen pumping effect and recirculating the delivered hydrogen through the exhaust gas return pipe 52 and the downstream pipe 32b to the cathode of the fuel cell stack 10 herein corresponds to the "first gas circulation mechanism" described in Solution to Problem section. The mechanism of separating hydrogen from the first exhaust gas by taking advantage of the hydrogen pumping effect of the second fuel cell stack 12 herein corresponds to the "fuel gas separating mechanism" described in the Solution to Problem section.

After step S134, the third pre-stop process follows steps S140a to S160 like the second pre-stop process (FIG. 3). After step S160, the controller 500 stops the voltage application from the external DC power source 210 to the second fuel cell stack 12 and turns OFF the switch SW3 of the load connector 48 (step S164). The controller 500 then returns the port open-close setting of the three-way valve V5 to the original setting before start of the pre-stop process and makes the upstream pipe 32a and the downstream pipe 32b communicate with each other (step S166). The third pre-stop process then performs step S170 and is terminated. The processing of steps S150 to S164 may be performed in no particular order but at any arbitrary timing.

As described above, the third pre-stop process separates hydrogen from the first exhaust gas and recirculated the separated hydrogen to the cathode of the fuel cell stack 10. This allows effective use of hydrogen in the pre-stop process. This also delivers a greater amount of hydrogen to the cathode of the fuel cell stack 10, thus increasing the hydrogen partial pressure in the cathode and decreasing the nitrogen partial pressure in the cathode within a shorter period of time. This enables the preset conditions of step S140a to be satisfied within a shorter period of time and thereby shortens the operation time of the pre-stop process.

B-3. Modifications of Second Embodiment

B-3-1. First Modification

The processing of step S140a may be replaced with step S140 of the first pre-stop process (FIG. 2). Such modified procedure also enables reduction of the variation of the cathode total pressure. Reducing the partial pressure difference of at least hydrogen, which has the higher permeation rate through the electrolyte membrane at a specific partial pressure difference than nitrogen, to or below the preset reference value reduces the variation of the cathode total pressure and prevents negative pressure in the cathode. This prevents introduction of the air from outside the fuel cell stack 10 into the cathode.

B-3-2. Second Modification

The second fuel cell stack 12, the load connector 48 and the external DC power source 210 may be omitted, as long as the exhaust gas return pipe 52 is provided to be branched off from the oxidizing gas exhaust pipe 33 and to be connected with the oxidizing gas supply pipe 32. According to this embodiment, the processing of steps S134 and S164 (FIG. 5) may also be omitted. This enables recirculation of the hydrogen-containing first exhaust gas to the cathode and thereby ensures effective use of hydrogen in the pre-stop process.

B-3-3. Third Modification

Like the first modification of the first embodiment, the oxygen reducing process may also be omitted in the second embodiment. Like the first modification of the first embodiment, the supply source of hydrogen to the anode may be only the fuel gas tank 21 in the gas delivering process. Like the second modification of the first embodiment, the valve V4 may be omitted. Like the third modification of the first embodiment, pure oxygen may be supplied as the oxidizing gas. Like the fourth modification of the first embodiment, the measurement value of the oxygen concentration sensor may be used, instead of the voltage, as the criterion of determination in the oxygen reducing process.

B-3-4. Fourth Modification

The third pre-stop process takes advantage of the hydrogen pumping effect to separate hydrogen from the first exhaust gas, but this is not essential. For example, a hydrogen separation membrane may be provided to separate hydrogen from the first exhaust gas. This does not require the device assembly of producing the hydrogen pumping effect, such as the second fuel cell stack, for separation of hydrogen.

C. Third Embodiment

C-1. Configuration of Third Embodiment

Figure 6:
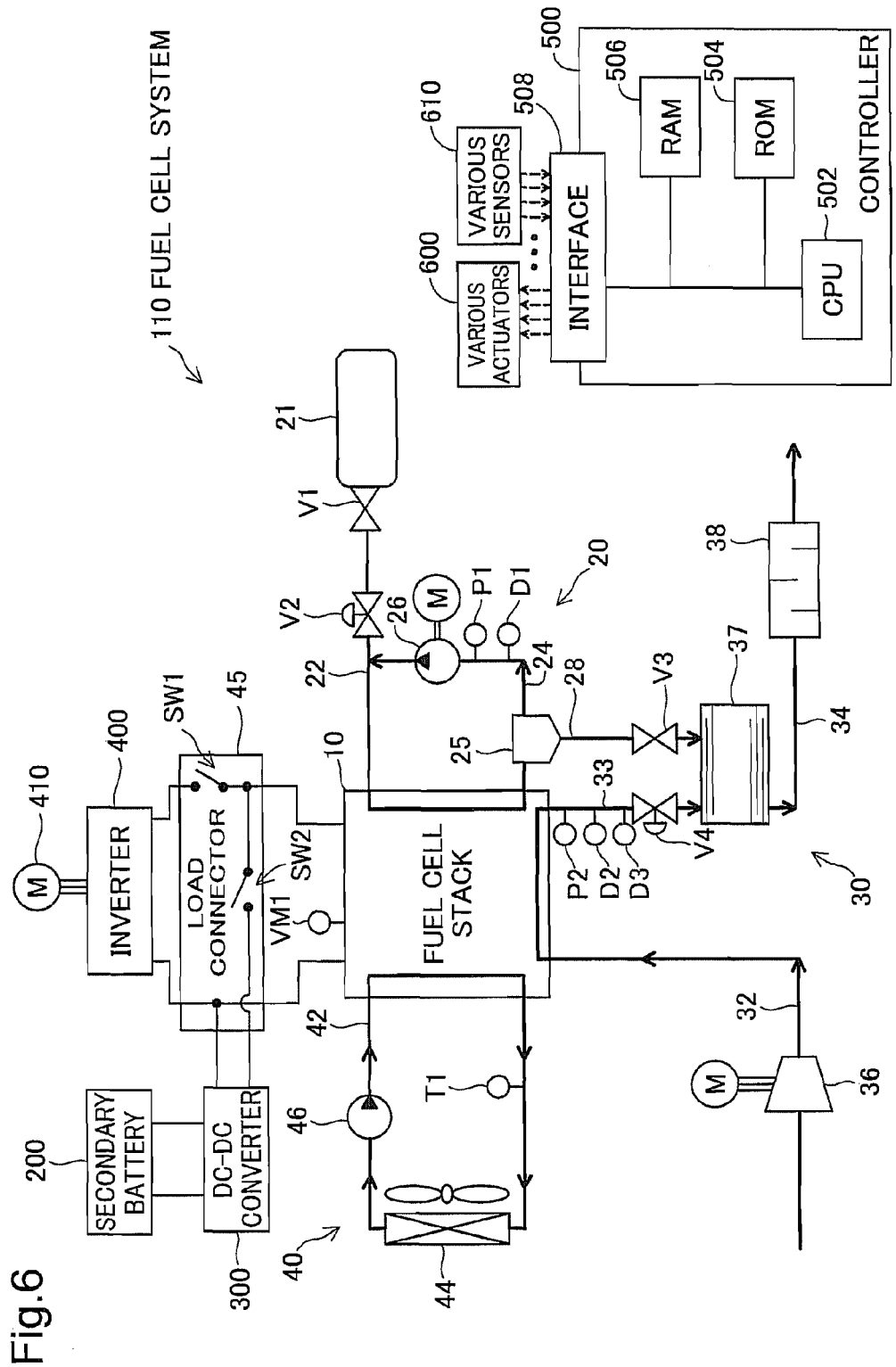
FIG. 6 illustrates the general configuration of an electric vehicle with a fuel cell system 110 according to a third embodiment of the invention.

FIG. 6 illustrates the general configuration of an electric vehicle with a fuel cell system 110 according to a third embodiment of the invention. The difference from the first embodiment includes that an oxygen concentration sensor D3 is provided in the oxidizing gas exhaust pipe 33. Otherwise the third embodiment has the similar configuration to that of the first embodiment. The like structures to those of the first embodiment are shown by the like symbols and are not specifically described here.

The oxygen concentration sensor D3 measures the concentration of oxygen present in the oxidizing gas exhaust pipe 33. The oxygen concentration measured by the oxygen concentration sensor D3 is used for control in the pre-stop process as described below.

C-2. Pre-Stop Process of Third Embodiment

Figure 7:
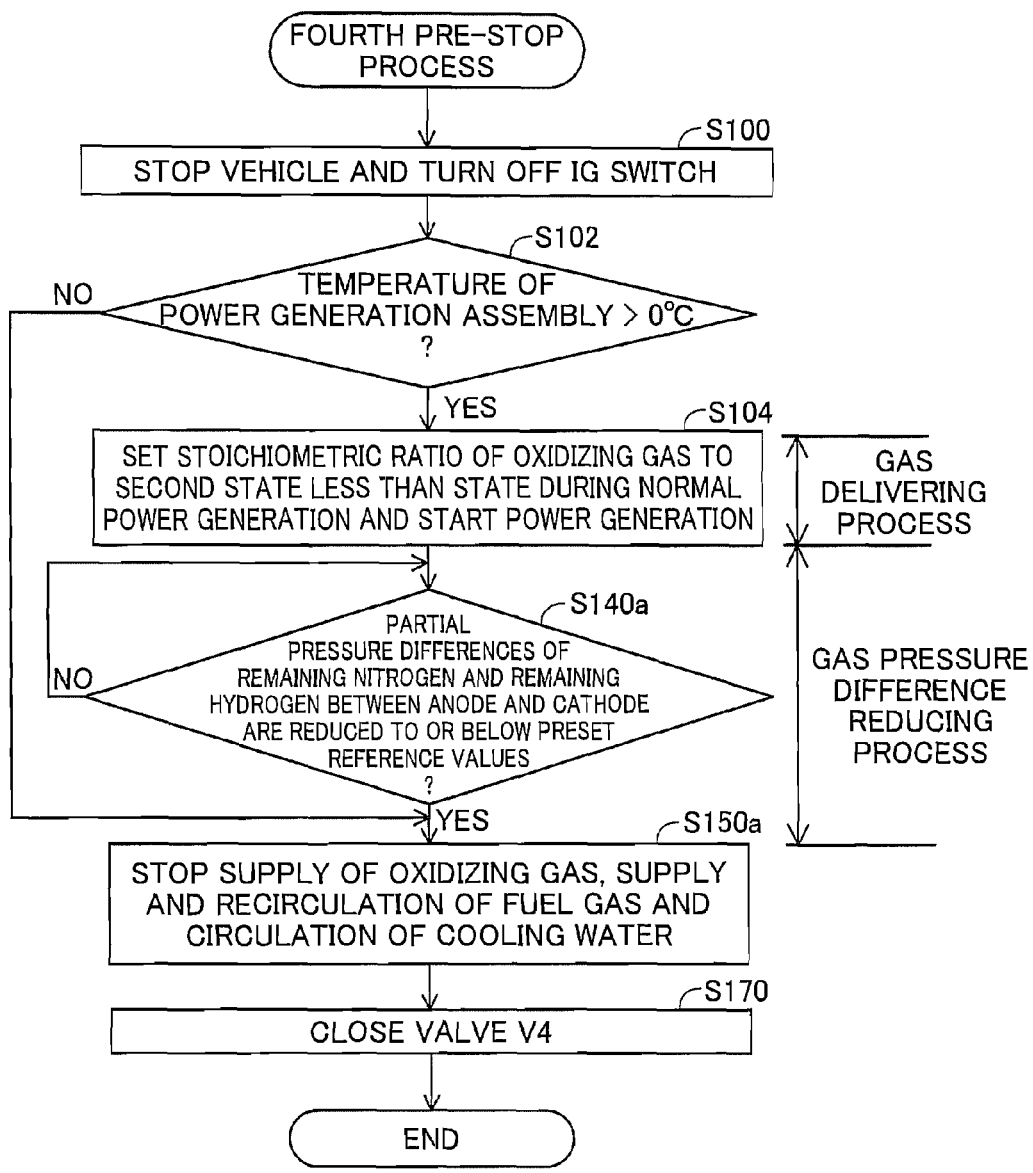
FIG. 7 is a flowchart showing a fourth aspect of pre-stop process.

FIG. 7 is a flowchart showing a fourth aspect of pre-stop process (hereinafter called "fourth pre-stop process") performed by the controller 500 according to the third embodiment. The primary difference from the second pre-stop process (FIG. 3) includes the gas supply method in the gas delivering process and the steps performed before the gas delivering process. The like steps to those of the second pre-stop process are shown by the like step numbers and are not specifically described here.

After step S100, the controller 500 determines whether the temperature of the power generation assembly is higher than 0° C. (step S102). According to this embodiment, the temperature obtained from the temperature sensor T1 is assumed as the temperature of the power generation assembly. When the temperature of the power generation assembly is not higher than 0° C., i.e., is equal to or lower than 0° C. (step S102: No), the controller 500 stops the supply and recirculation of the oxidizing gas and the fuel gas and the circulation of cooling water to the fuel cell stack 10 (step S150a) and performs the processing of step S170, while skipping the gas delivering process and the gas pressure difference reducing process described below.

When the temperature of the power generation assembly is higher than 0° C. (step S102: Yes), on the other hand, the controller 500 sets the stoichiometric ratio of the oxidizing gas (also called "air stoichiometric ratio" in the specification hereof) to a second state that is less than the state during normal power generation and controls the fuel cell stack 10 to start power generation (step S104). The electric power generated by the processing of step S104 may be accumulated in the secondary battery 200 or may be consumed as the electric power for the pre-stop process. Setting the smaller air stoichiometric ratio causes hydrogen supplied to the anode to be delivered to the cathode in the fuel cell stack 10. More specifically, hydrogen ion moving from the anode to the cathode across the electrolyte membrane does not react with oxygen but gains an electron to produce hydrogen atom in the deficiency of oxygen in the cathode. The air stoichiometric ratio represents an oxygen excess rate indicating an excess rate of the supply amount of oxygen to the right amount of oxygen just enough for the reaction with hydrogen. The air stoichiometric ratio may be expressed by W1/W2, wherein W1 represents the supply amount of oxygen and W2 represents the right amount of oxygen just enough for consuming the supplied hydrogen. The mechanism of setting the smaller air stoichiometric ratio to start power generation and delivering hydrogen supplied to the anode to the cathode (fuel gas tank 21, fuel gas supply pipe 22, fuel cell stack 10, oxidizing gas supply pipe 32, air compressor 36, secondary battery 200 or inverter 400, and load connector 45) herein corresponds to the "first gas supply mechanism" described in Solution to Problem section.

The air stoichiometric ratio may be set and changed adequately in a range smaller than the air stoichiometric ratio during normal operation, depending on the operation state of the pre-stop process. The air stoichiometric ratio is preferably set in a range of 0.8 to 1.05 and is more preferably set to about 1. The smaller air stoichiometric ratio than 0.8 may cause significantly small electric power generated by the fuel cell stack 10 and prevent the migration of hydrogen from the anode to the cathode. The greater air stoichiometric ratio than 1.05 may cause no deficiency of oxygen in the cathode and prevent the production of hydrogen in the cathode. The controller 500 determines deficiency or no deficiency of oxygen in the cathode, based on the signal on the oxygen concentration sent from the oxygen concentrations sensor D3 to the controller 500, and controls the low efficiency operation. The air stoichiometric ratio during normal operation is set in a range of 1.2 to 1.5.

After step S104, the controller 500 determines whether the partial pressure differences of the remaining nitrogen and the remaining hydrogen between the anode and the cathode satisfy the preset conditions (step S140a). When it is determined that the preset conditions are not satisfied (step S140a), power generation in the second state with the smaller air stoichiometric ratio continues. This further increases the hydrogen partial pressure and further decreases the nitrogen partial pressure in the cathode. Continuously increasing the hydrogen partial pressure and decreasing the nitrogen partial pressure in the cathode reduces the partial pressure differences of the remaining nitrogen and the remaining hydrogen between the anode and the cathode to or below the preset reference values.

When determining that the partial pressure differences of the remaining nitrogen and the remaining hydrogen between the anode and the cathode satisfy the preset conditions (step S140a: Yes), the controller 500 stops the supply and recirculation of the oxidizing gas and the fuel gas and the circulation of cooling water (step S150a). The controller 500 then performs the processing of step S170 to stop the fuel cell system 110.

The gas delivering process enables easy delivery of hydrogen to the cathode by simply setting the smaller air stoichiometric ratio (step S104) without requiring an external power source to apply a voltage to the fuel cell stack 10. The electric power generated during the pre-stop process of this aspect may be accumulated in the secondary battery 200 or may be consumed for the pre-stop process. This accordingly ensures the effective use of the generated electric power. Power generation with the smaller air stoichiometric ratio than the air stoichiometric ratio during normal operation causes the oxides accumulated on the surface of the cathode catalyst layer during normal operation to be removed from the surface and enables the performance recovery of the cathode catalyst layer. Additionally, like the second embodiment, the pre-stop process of this embodiment makes the partial pressure differences of both hydrogen and nitrogen between the two electrodes satisfy the preset conditions (step S140a). This embodiment accordingly further reduces the variation of the cathode total pressure and inhibits oxidation of the cathode component material, like the second embodiment.

Figure 8:
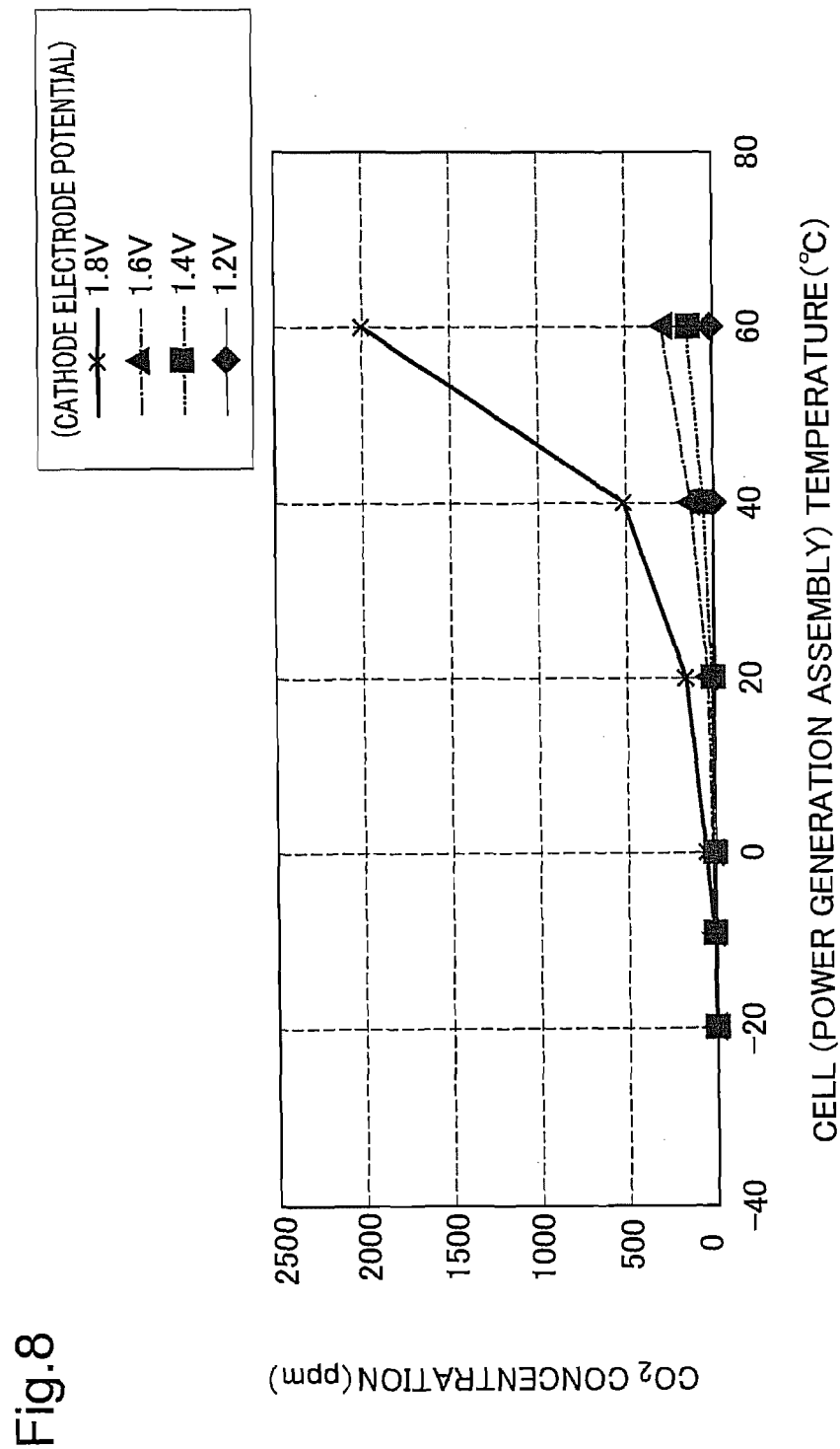
FIG. 8 is a graph showing the relationship between the unit cell temperature and the $CO_2$ concentration, with respect to different cathode electrode potentials.

The reason for performing step S102 is described. FIG. 8 is a graph showing the relationship between the temperature of the unit cell (power generation assembly) and the carbon dioxide ($CO_2$) concentration, with respect to different cathode electrode potentials. The $CO_2$ concentration herein means the concentration of $CO_2$ included in the exhaust oxidizing gas discharged from the fuel cell stack during normal operation and is proportional to the degree of oxidation of the cathode component material of the cathode. The graph of FIG. 8 is obtained experimentally.

As shown in FIG. 8, the $CO_2$ concentration is extremely small at the cell temperature of not higher than 0° C., irrespective of the cathode electrode potential. There is substantially no oxidation of carbon in the fuel cell stack even at the electrode potential of or over 1.4 V where oxidation of carbon generally starts. At the cell temperature of higher than 0° C., on the other hand, the $CO_2$ concentration increases with an increase in cathode electrode potential. In other words, the degree of oxidation of carbon increases with an increase in cathode electrode potential to or over 1.4 V at the cell temperature of higher than 0° C.

The inventors have found that power generation of the fuel cell stack at the cell temperature of not higher than 0° C. and with the smaller air stoichiometric ratio than the air stoichiometric ratio during normal power generation results in performance degradation of the cathode catalyst layer. More specifically, the inventors have found that part of the cathode catalyst layer is peeled off from the electrolyte membrane.

When the temperature of the power generation assembly is higher than 0° C. (step S102: Yes), the fourth pre-stop process performs the gas delivering process and the gas pressure difference reducing process (step S104 and step S140a) (FIG. 7). When the temperature of the power generation assembly is not higher than 0° C. (step S102: No), on the other hand, the fourth pre-stop process stops the system without the gas delivering process and the gas pressure difference reducing process. This inhibits oxidation of the cathode component material, while preventing the performance degradation of the cathode catalyst layer.

C-3. Modifications of Third Embodiment

C-3-1. First Modification

The processing of step S102 may be omitted. Such modified procedure still enables at least reduction of the variation of the cathode total pressure and prevention of the oxidation of the cathode component material. The secondary battery 200 and the DC-DC converter 300 may be omitted. Such modified structure enables the gas delivering process.

C-3-2. Second Modification

Like the first modification of the third second embodiment, the processing of step S140a may be replaced with step S140 (FIG. 2). Like the second modification of the first embodiment, the valve V4 may not be provided in the oxidizing gas exhaust pipe 33. Like the third modification of the first embodiment, pure oxygen may be used as the oxidizing gas.

C-3-3. Third Modification

The processing of step S104 (FIG. 7) may be modified to start power generation with setting the stoichiometric ratio of the fuel gas (hereinafter also called "hydrogen stoichiometric ratio") to be less than the hydrogen stoichiometric ratio during normal power generation, in addition to the smaller air stoichiometric ratio. This increases the nitrogen concentration and decreases the hydrogen concentration in the anode (i.e., increases the nitrogen partial pressure and decreases the hydrogen partial pressure in the anode), thus enabling the preset conditions of step S140a to be satisfied within a shorter period of time and shortening the operation time of the pre-stop process. The hydrogen stoichiometric ratio may be set and changed adequately in a range smaller than the hydrogen stoichiometric ratio during normal power generation. The hydrogen stoichiometric ratio is preferably set in a range of 1.0 to 1.2 and is more preferably set in a range of 1.0 to 1.05. According to this embodiment, the hydrogen stoichiometric ratio during normal operation is set to about 1.2.

D. Fourth Embodiment

D-1. Configuration of Fourth Embodiment

Figure 9:
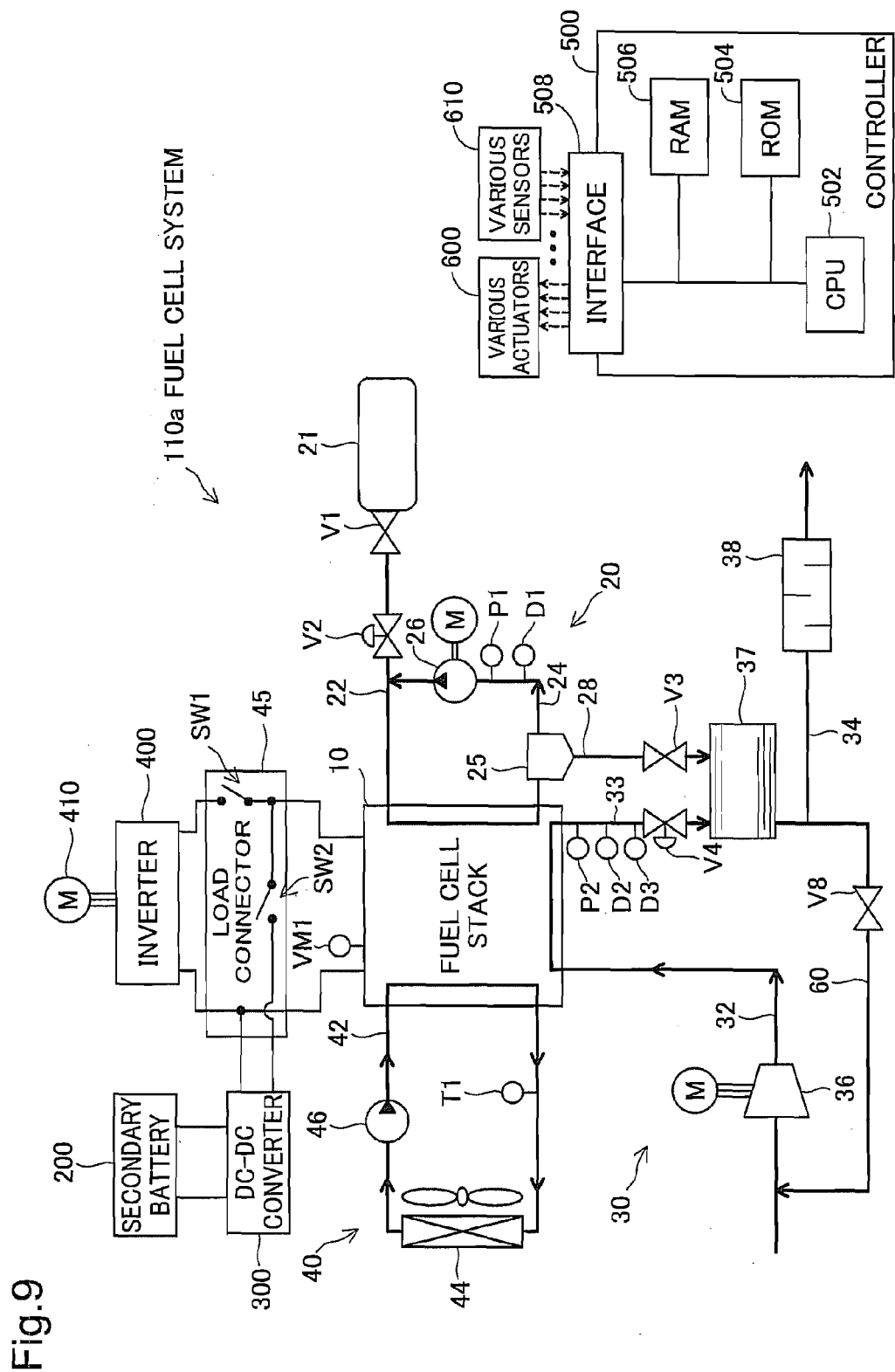
FIG. 9 illustrates the general configuration of an electric vehicle with a fuel cell system 110a according to a fourth embodiment of the invention.

FIG. 9 illustrates the general configuration of an electric vehicle with a fuel cell system 110a according to a fourth embodiment of the invention. The difference from the third embodiment includes addition of a mechanism of recirculating the exhaust gas that is discharged to the oxidizing gas exhaust pipe 33, to the cathode as the first gas. Otherwise the fourth embodiment has the similar configuration to that of the third embodiment. The like structures to those of the third embodiment are shown by the like symbols and are not specifically described here.

The fuel cell system 100a includes an exhaust gas return pipe 60, which is connected with the piping 34 and the oxidizing gas supply pipe 32. A valve V8 is provided in the exhaust gas return pipe 60. The valve V8 is closed during normal operation of the fuel cell stack 10.

D-2. Pre-Stop Process of Fourth Embodiment

Figure 10:
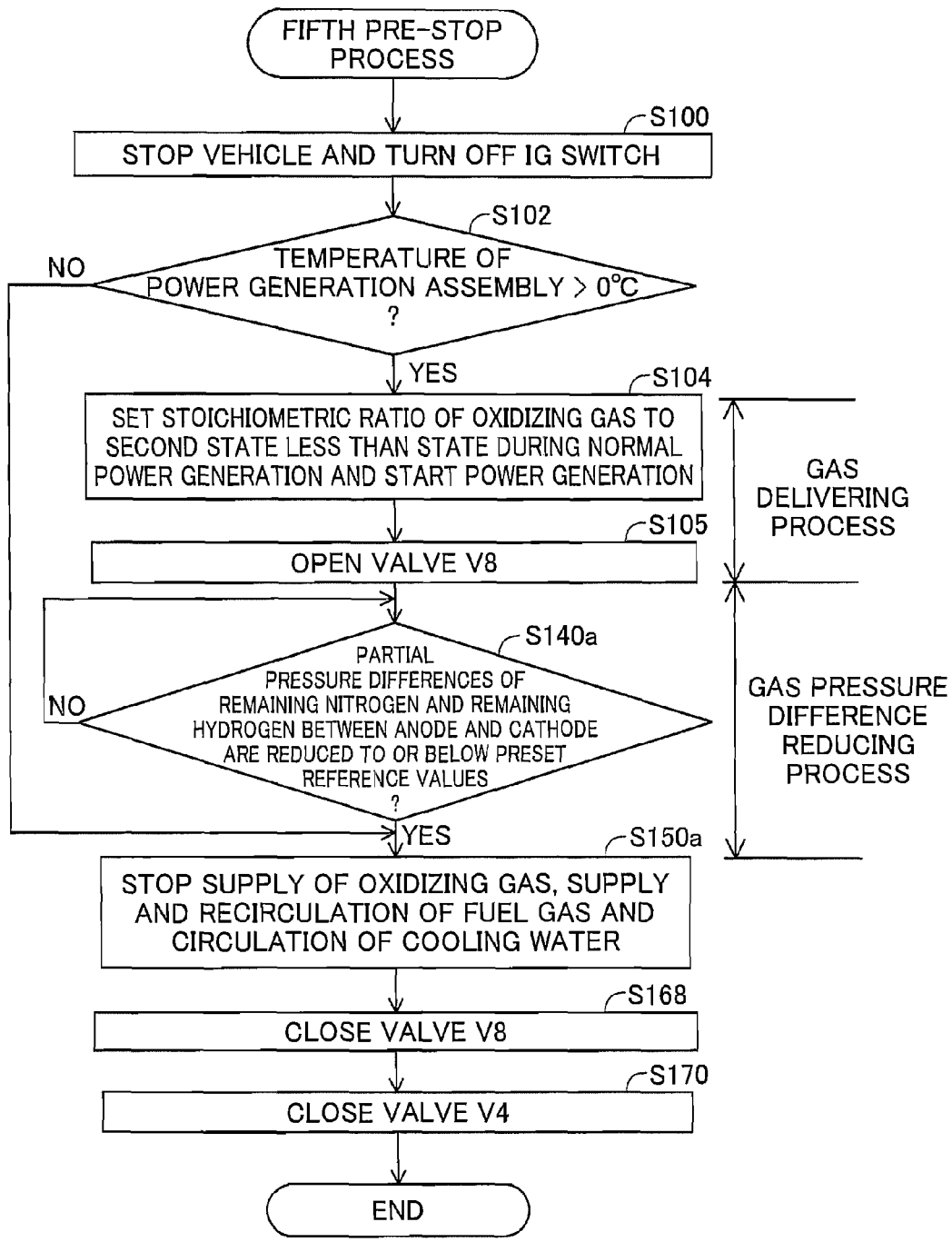
FIG. 10 is a flowchart showing a fifth aspect of pre-stop process.

FIG. 10 is a flowchart showing a fifth aspect of pre-stop process (hereinafter called "fifth pre-stop process") performed by the controller 500 according to the fourth embodiment. The difference from the fourth pre-stop process includes addition of steps S105 and S168. The like steps are shown by the like step numbers and are not specifically described here.

After step S104, the controller 500 opens the valve V8 (step S105). This enables part of the hydrogen-containing first exhaust gas to be branched off from the piping 34 and to be introduced into the oxidizing gas supply pipe 32 via the exhaust gas return pipe 60. The hydrogen-containing first exhaust gas can thus be recirculated as the first gas to the cathode. The processing of steps S104 and S105 may be performed in no particular order.

When step S140a is Yes, the controller 500 closes the valve V8 (step S168), in addition to the processing of step S150a.

As described above, the fifth pre-stop process recirculates the hydrogen-containing first exhaust gas to the cathode, thus enabling the effective use of hydrogen for the pre-stop process. Additionally, the fifth pre-stop process has the same advantageous effects to those of the fourth pre-stop process.

D-3. Modifications of Fourth Embodiment

D-3-1. First Modification

The first to the third modifications of the third embodiment are also applicable to the fourth embodiment.

D-3-2. Second Modification

Another application may additionally have a mechanism of separating hydrogen from the first exhaust gas present in the exhaust gas return pipe 60 and recirculating the separated hydrogen to the oxidizing gas supply pipe 32. For example, as described in the second embodiment, the second fuel cell stack 12, the load connector 48 and the external DC power source 210 (FIG. 4) may be provided. This mechanism separates hydrogen from the first exhaust gas present in the exhaust gas return pipe 60 by taking advantage of the hydrogen pumping effect and recirculates the separated hydrogen as the first gas to the cathode of the fuel cell stack 10. This advantageously completes the gas pressure difference reducing process of step S140a within a shorter period of time. Alternatively a hydrogen separation membrane may be used to separate hydrogen from the first exhaust gas.

E. Fifth Embodiment

E-1. Configuration of Fifth Embodiment

Figure 11:
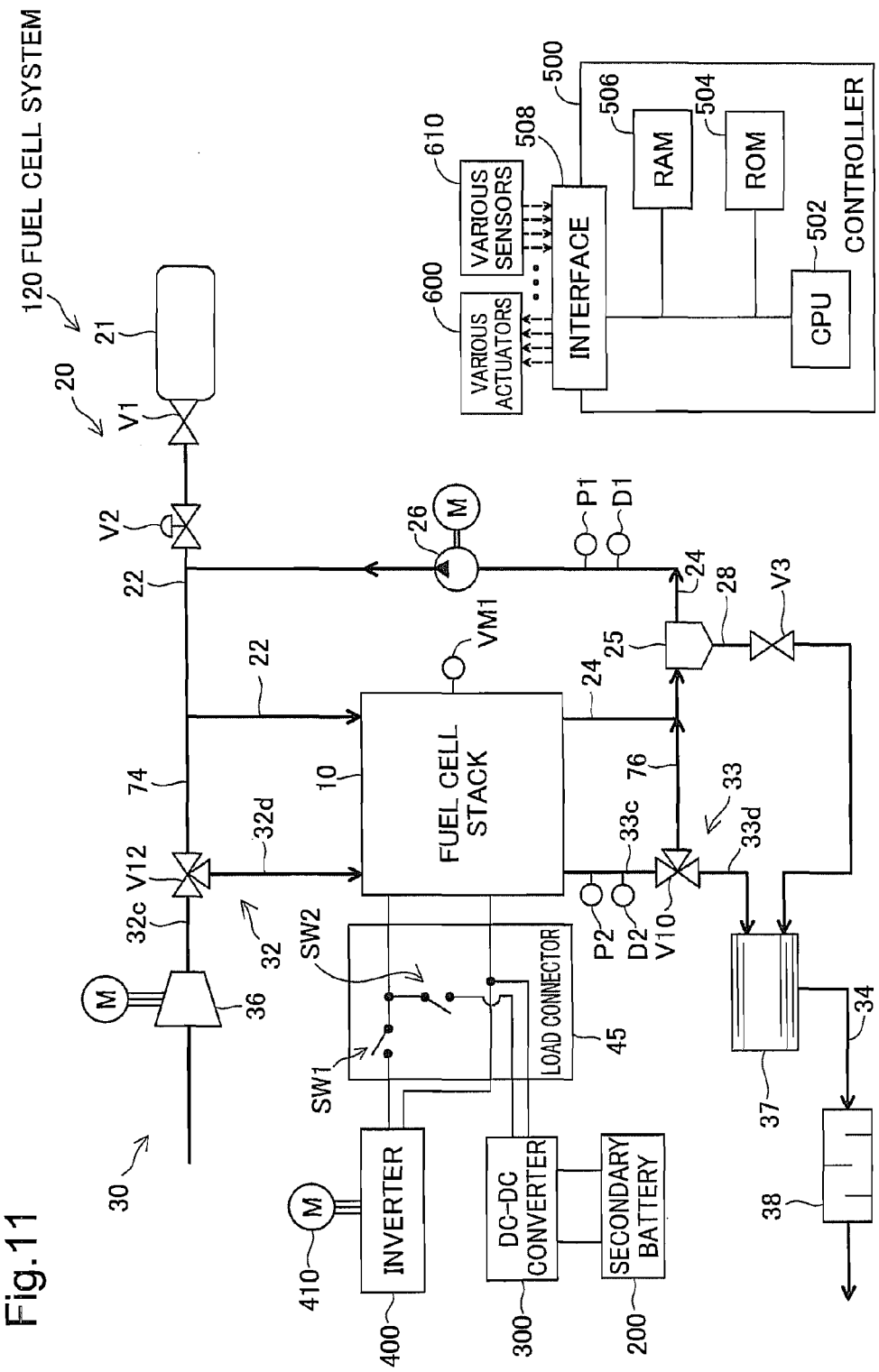
FIG. 11 illustrates the general configuration of an electric vehicle with a fuel cell system 120 according to a fifth embodiment of the invention.

FIG. 11 illustrates the general configuration of an electric vehicle with a fuel cell system 120 according to a fifth embodiment of the invention. The difference from the first embodiment includes addition of first and second bypass pipes 74 and 76 and three-way valves V10 and V12. Otherwise the fifth embodiment has the similar configuration to that of the first embodiment. The like structures to those of the first embodiment are shown by the like symbols and are not specifically described here. The cooling water system 40 (FIG. 1) is omitted from the illustration of the fifth embodiment.

The first bypass pipe 74 is connected with the fuel gas supply pipe 22 and with the oxidizing gas supply pipe 32. The three-way valve V12 is provided at the joint between the oxidizing gas supply pipe 32 and the first bypass pipe 74. An upstream section of the oxidizing gas supply pipe 32 in the upstream of the three-way valve V12 is called first pipe 32c, and a downstream section in the downstream of the three-way valve V12 is called second pipe 32d.

The second bypass pipe 76 is connected with the fuel gas circulation pipe 24 and with the oxidizing gas exhaust pipe 33. The three-way valve V10 is provided at the joint between the oxidizing gas exhaust pipe 33 and the second bypass pipe 76. An upstream section of the oxidizing gas exhaust pipe 33 in the upstream of the three-way valve V10 is called third pipe 33c, and a downstream section in the downstream of the three-way valve V10 is called fourth pipe 33d. The controller 500 controls the port open-close settings of the three-way valves V10 and V12 to change the connection state of the pipes. During normal power operation of the fuel cell stack 10, the first bypass pipe 74 does not communicate with the oxidizing gas supply pipe 32 and the second bypass pipe 76 does not communicate with the oxidizing gas exhaust pipe 33.

E-2. Pre-Stop Process of Fifth Embodiment

E-2-1. Sixth Aspect of Pre-Stop Process

Figure 12:
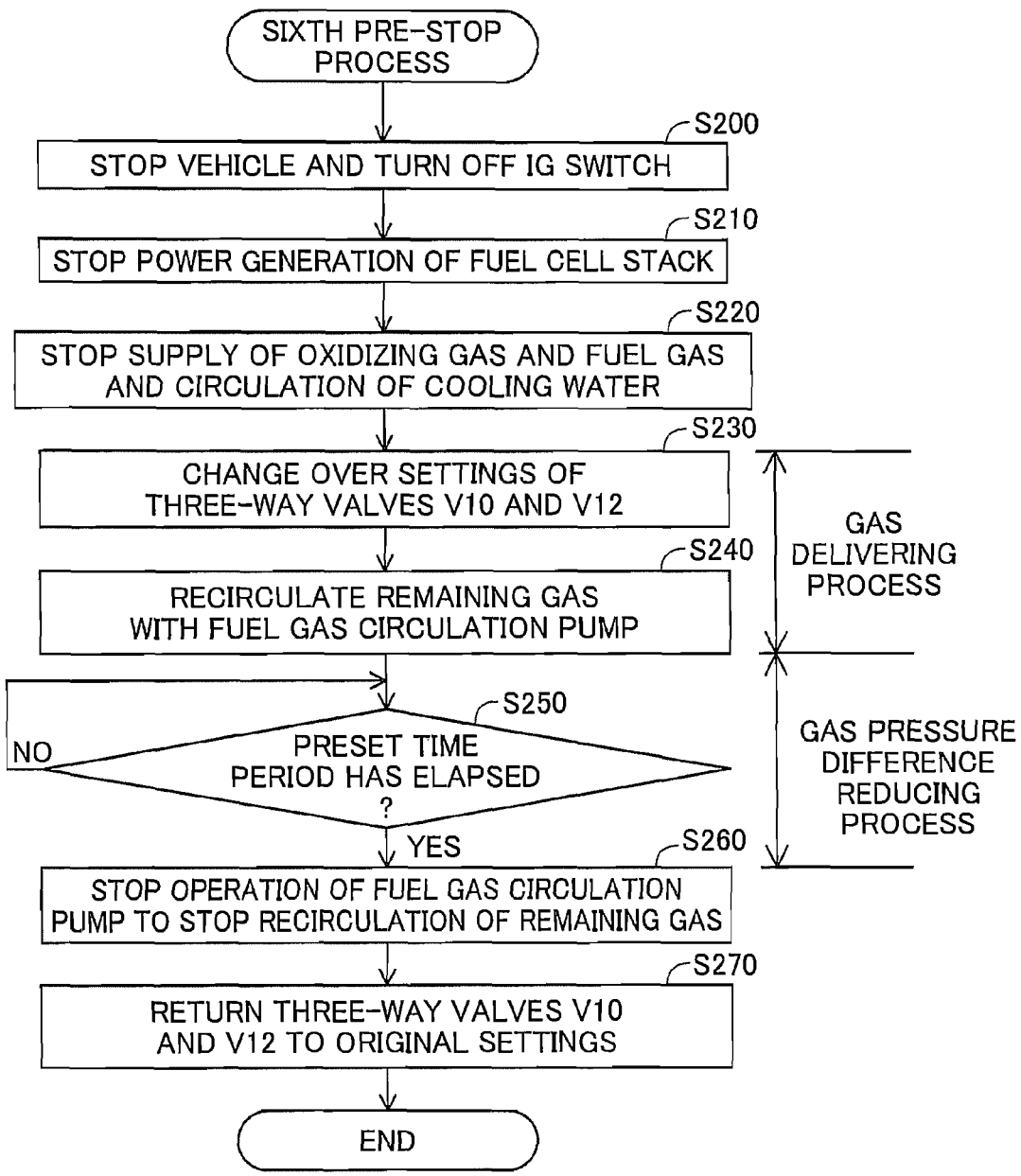
FIG. 12 is a flowchart showing a sixth aspect of pre-stop process.

FIG. 12 is a flowchart showing a sixth aspect of pre-stop process (hereinafter called "sixth pre-stop process") performed by the controller 500 according to the fifth embodiment. The processing of step S200 is identical with step S100 in the first pre-stop process. When the controller 500 receives the IG switch OFF signal at step S200, the controller 500 stops power generation of the fuel cell stack 10 (step S210). More specifically, the controller 500 controls the load connector 45 to turn OFF both the switches SW1 and SW2 and thereby stops the output of electric power.

The controller 500 then stops the supply of the oxidizing gas and the fuel gas and the circulation of cooling water (step S220). More specifically, the controller 500 closes the valves V1 and V2 and stops the operation of the air compressor 36 and the circulation pump. The process of "stopping the supply of the fuel gas" at step S220 closes the shutoff valve V1 and the pressure regulator V2 to stop the supply of the fuel gas from the fuel gas tank 21, while continuing the operation of the fuel gas circulation pump 26. The processing of steps S210 and S220 may be performed in no particular order but at any arbitrary timing.

The controller 500 subsequently changes over the port open-close settings of the three-way valves V10 and V12 (step S230). Such changeover connects the first bypass pipe 74 with the second pipe 32d, while disconnecting the first pipe 32c from the second pipe 32d. The changeover also connects the second bypass pipe 76 with the third pipe 33c, while disconnecting the third pipe 33c from the fourth pipe 33d. This forms a circulation delivery path to recirculate and deliver the first gas to the anode and the cathode.

Operating the fuel gas circulation pump 26 recirculates and agitates the fuel gas and the oxidizing gas remaining in the fuel gas supply/exhaust system 20 and the oxidizing gas supply/exhaust system 30 and delivers the agitated remaining gas as the first gas to the anode and the cathode (step S240).

The controller 500 then determines whether a preset time period has elapsed since the start of step S240 (step S250). The time period herein is set to a period of time required for sufficiently reducing the concentration variation of the gas remaining in the anode, the cathode, the fuel gas supply/exhaust system 20 and the oxidizing gas supply/exhaust system 30. Sufficiently reducing the concentration variation of the gas enables the gas of the same composition and substantially the same concentration to be delivered to the two electrodes and leads to the assumption that the partial pressure difference of each gas component between the two electrodes is reduced to or below the preset reference value (e.g., the partial pressure difference of approximately zero). The processing of step S250 is accordingly equivalent to step S140a in the second pre-stop process (FIG. 3) and corresponds to the gas pressure difference reducing process like step S140a.

When it is determined that the preset time period has not yet elapsed (step S250: No), the controller 500 continues the recirculation of the remaining gas by the fuel gas circulation pump 26. When it is determined that the preset time period has elapsed (step S250: Yes), on the other hand, the controller 500 stops the operation of the fuel gas circulation pump 26 to stop the delivery and recirculation of the remaining gas (step S260). The controller 500 then returns the port open-close settings of the three-way valves V10 and V12 to the original settings before the start of the pre-stop process to connect the first pipe 32c with the second pipe 32d and connect the third pipe 33c with the fourth pipe 33d.

As described above, the sixth pre-stop process delivers the gas of the same composition and the sufficiently reduced concentration variation as the first gas to both the anode and the cathode and thereby readily reduces the partial pressure difference of each gas component between the cathode and the anode to or below the preset reference value without any special control. The gas remaining in the fuel gas supply/exhaust system 20 and the oxidizing gas supply/exhaust system 30 is used as the first gas, so that the amount of the first gas used for the pre-stop process can be reduced. This does not require a gas exclusively used for the pre-stop process separately from the reactive gases during normal power generation. Like the other pre-stop processes, the sixth pre-stop process performs the gas pressure difference reducing process to reduce the variation of the cathode total pressure and inhibit oxidation of the cathode component material. This also prevents negative pressure in the cathode after the system stop and does not need a mechanism of the high sealing property at the cathode exit, thus enabling cost reduction.

The mechanism of changing over the port open-close settings of the three-way valves V10 and V12 to connect the first bypass pipe 74 with the second pipe 32d and connect the second bypass pipe 76 with the third pipe 33c and operating the fuel gas circulation pump 26 to deliver the gas remaining in the fuel gas supply/exhaust system 20 and the oxidizing gas supply/exhaust system 30 to the cathode and the anode herein corresponds to the "first gas supply mechanism" described in Solution to Problem section. The mechanism of changing over the port open-close setting of the three-way valve V10 to connect the second bypass pipe 76 with the third pipe 33c and mix the exhaust gases from the anode and the cathode and operating the fuel gas circulation pump 26 to recirculate the exhaust gas mixture to the fuel gas supply pipe 22 herein corresponds to the "exhaust gas circulation mechanism" described in Solution to Problem section. The mechanism of changing over the port open-close setting of the three-way valve V12 to connect the first bypass pipe 74 with the second pipe 32d and delivering the first gas to the anode through the fuel gas supply pipe 22 herein corresponds to the "anode supply mechanism" described in Solution to Problem section.

E-2-2. Seventh Aspect of Pre-Stop Process

Figure 13:
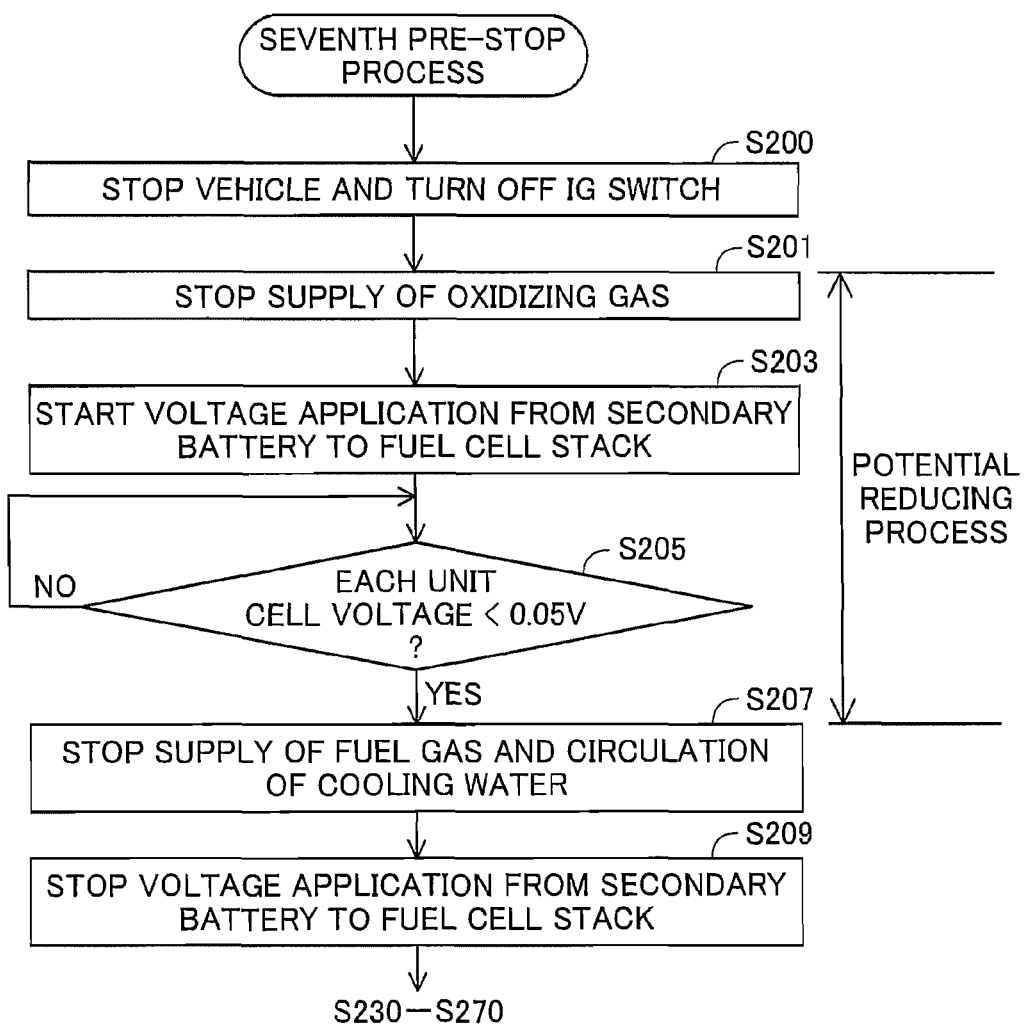
FIG. 13 is a flowchart showing a seventh aspect of pre-stop process.

FIG. 13 is a flowchart showing a seventh aspect of pre-stop process (hereinafter called "seventh pre-stop process") performed by the controller 500 according to the fifth embodiment. The difference from the sixth pre-stop process (FIG. 12) includes addition of "potential reducing process" to reduce the cathode electrode potential below the level during normal power generation, prior to the gas delivering process. Otherwise the seventh pre-stop process is similar to the sixth pre-stop process. The like steps are shown by the like step numbers and are not specifically described here.

After step S200, the controller 500 stops the operation of the air compressor 36 to stop the supply of the oxidizing gas to the cathode (step S201). The controller 500 subsequently controls the DC-DC converter 300 to start the voltage application from the secondary battery 200 to the fuel cell stack 10 (step S203). At step S203, the controller 500 also controls the load connector 45 to turn OFF the switch SW1. This produces the hydrogen pumping effect to deliver hydrogen to the cathode and discharge the oxygen-containing gas remaining in the cathode out of the system through the third and fourth pipes 33c and 33d and the piping 34. Replacing the cathode atmosphere by hydrogen reduces the cathode electrode potential below the level before the start of the pre-stop process (i.e., the level during normal operation). The mechanism of delivering hydrogen to the cathode by the hydrogen pumping effect and reducing the cathode electrode potential herein corresponds to the "potential processing mechanism" described in Solution to Problem section.

After step S203, the controller 500 determines whether the voltage of each unit cell is less than a preset value (step S205). This value may be set in a range that prevents an increase in cathode electrode potential to the electrode potential level causing oxidation of carbon (for example, 1.4 V or above) in the gas delivering process described below. In this aspect, this value is set to 0.05 V.

When it is determined that each unit cell voltage is not less than 0.05 V (step S205: No), the determination of step S205 is repeated. When it is determined that each unit cell is less than 0.05 V (step S205: Yes), the controller 500 stops the supply of the fuel gas and the circulation of cooling water and stops the voltage application from the secondary battery 200 to the fuel cell stack 10 (steps S207 and S209). Like the sixth pre-stop process, the process of "stopping the supply of the fuel gas" in this pre-stop process stops the supply of the fuel gas from the fuel gas tank 21, while continuing the operation of the fuel gas circulation pump 26. After step S209, the seventh pre-stop process follows steps S230 to S270, like the sixth pre-stop process.

Reducing the cathode electrode potential prior to the gas delivering process effectively prevents the occurrence of abnormal cathode potential due to the supply of oxygen contained in the first gas to the anode during the gas delivering process. Additionally, the seventh pre-stop process has the same advantageous effects to those of the sixth pre-stop process.

E-3. Modifications of Fifth Embodiment

E-3-1. First Modification

Figure 14:
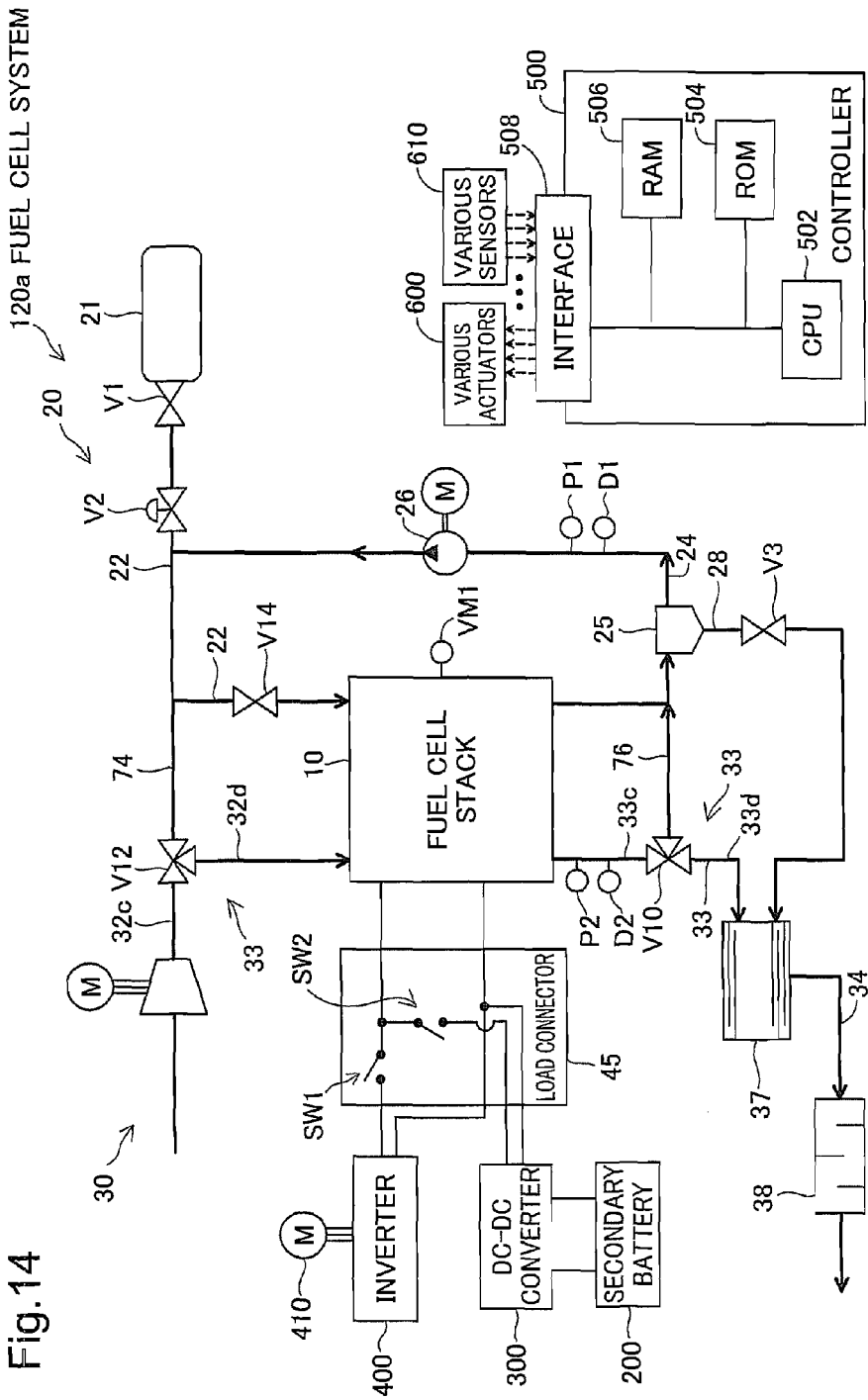
FIG. 14 illustrates the configuration of a fuel cell system 120a according to a first modification.

FIG. 14 illustrates the configuration of a fuel cell system 120a according to a first modification. The difference from the configuration of the fifth embodiment includes addition of a valve V14 provided in the fuel gas supply pipe 22. Otherwise the first modification has the similar configuration to that of the fifth embodiment. The like structures are shown by the like symbols and are not specifically described here. The valve V14 is located in the downstream of the connection of the first bypass pipe 74 (i.e., on the side closer to the fuel cell stack 10) in the fuel gas supply pipe 22. The valve V14 is open during normal operation.

Figure 15:
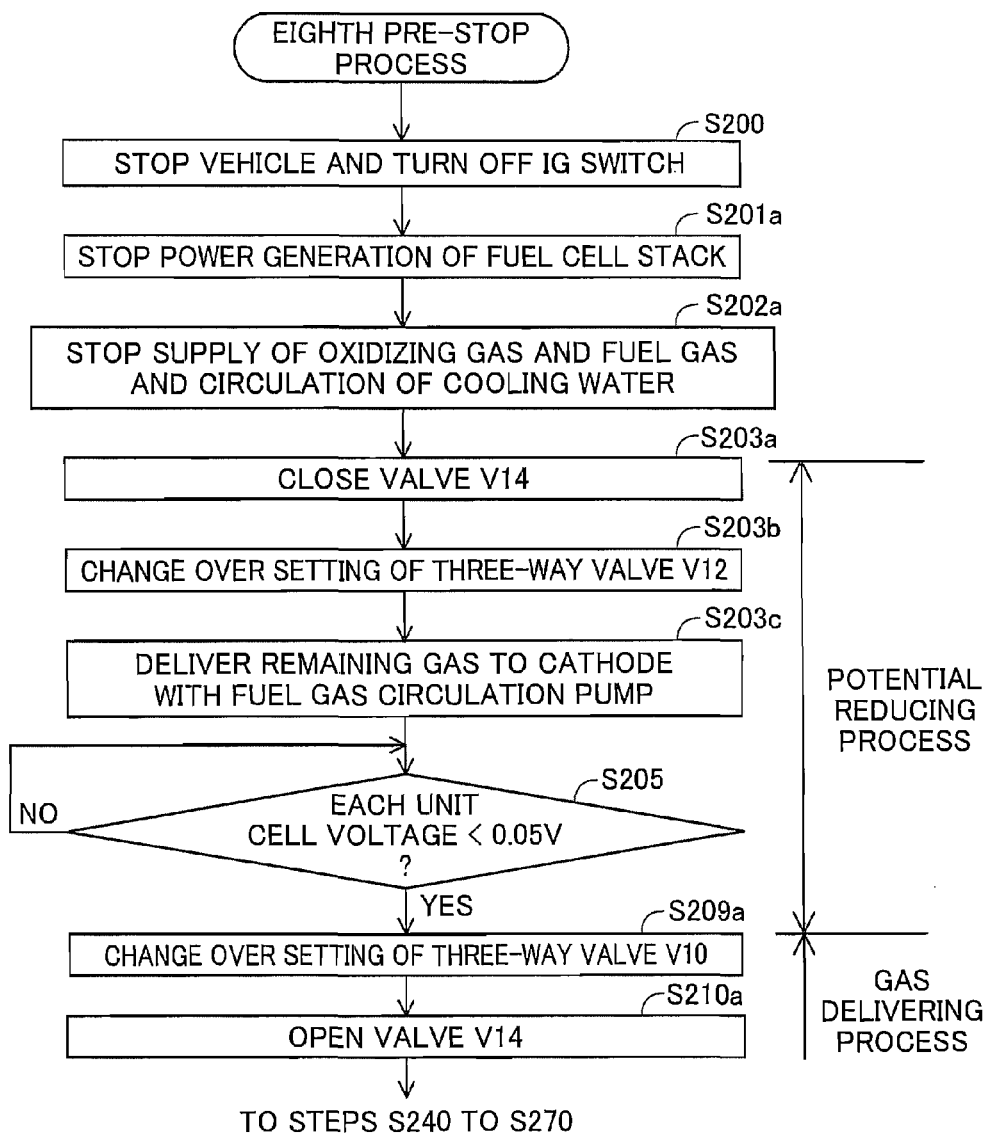
FIG. 15 is a flowchart showing an eighth aspect of pre-stop process.

FIG. 15 is a flowchart showing an eighth aspect of pre-stop process (hereinafter called "eighth pre-stop process") performed by the controller 500 according to the first modification. The difference from the seventh pre-stop process includes the detailed operation of the potential reducing process. The like steps to those of the sixth or the seventh pre-stop process are shown by the like step numbers and are not specifically described here. The gas delivering process and the gas pressure difference reducing process performed after the potential reducing process follow the same procedure as that of the sixth pre-stop process (FIG. 12) and are not described here.

After step S200, the controller 500 stops power generation of the fuel cell stack 10 (step S201a). The controller 500 subsequently stops the supply of the oxidizing gas and the fuel gas and the circulation of cooling water (step S202a), while continuing the operation of the fuel gas circulation pump 26. The processing of steps S201a and S202a are equivalent to the processing of steps S210 and S220 in the sixth pre-stop process.

The controller 500 then closes the valve V14 (step S203a) and changes over the port open-close setting of the three-way valve V12 to connect the first bypass pipe 74 with the second pipe 32d (step S203b). The operation of the fuel gas circulation pump preferentially delivers the fuel gas remaining in the fuel gas supply/exhaust system 20 to the cathode, while discharging the oxygen-containing gas remaining in the cathode out of the system through the third and fourth pipes 33c and 33d and the piping 34 (step S203c). The mechanism of closing the valve V14 and delivering the fuel gas remaining in the fuel gas supply/exhaust system 20 to the cathode herein corresponds to the "anode remaining gas supply mechanism" described in Solution to Problem section.

Like the seventh pre-stop process (FIG. 13), the eighth pre-stop process performs step S205. When it is determined that the preset condition is not satisfied (step S205: No), continues delivering the remaining gas to the cathode. When it is determined that the preset condition is satisfied (step S205: Yes), on the other hand, the controller 500 changes over the port open-close setting of the three-way valve V10 to connect the third pipe 33c with the second bypass pipe 76 (step S209a) and subsequently opens the valve V14 (step S210a). This mixes the gases remaining in the fuel gas supply/exhaust system 20 and the oxidizing gas supply/exhaust system 30 and delivers the remaining gas mixture as the first gas to the anode and the cathode.

As described above, the eighth pre-stop process controls the open-close setting of the valve V14 to perform the potential reducing process. Unlike the seventh pre-stop process, this pre-stop process does not require the external DC power source to product the hydrogen pumping effect and readily performs the potential reducing process. The eighth pre-stop process may additionally change over the port open-close setting of the three-way valve V10 to connect the third pipe 33c with the second bypass pipe 76 at step S203b. This may recirculate the oxygen-containing gas remaining in the cathode through the second bypass pipe 76 to the cathode during the processing of step S203c. This also enables combustion of oxygen on the cathode catalyst and reduces the cathode electrode potential. The oxygen-containing gas remaining in the cathode can be effectively used for the subsequent gas delivering process.

E-3-2. Second Modification

In the seventh and eighth pre-stop processes (FIGS. 13 and 15), the controller 500 determines whether each unit cell voltage is less than the preset value at step S205. In one application, this determination step may determine whether a preset time period has elapsed. The time period may be set to a period of time that allows oxygen remaining in the cathode to be discharge out, based on the volume of the cathode and the amount of the gas per unit time delivered to the cathode in the potential reducing process.

In another application, this determination step may calculate the amount of the gas delivered to the cathode and determine whether the calculated amount of the delivered gas reaches or exceeds a preset value (e.g., the value representing the volume of the cathode). More specifically, for example, the seventh pre-stop process may calculate the amount of hydrogen moving from the anode to the cathode from the charge amount used for the hydrogen pumping effect and determine whether the calculated amount of hydrogen reaches or exceeds the preset value (e.g., the value representing the volume of the cathode), so as to identify the requirement or non-requirement of the gas delivering process.

In yet another application, this determination step may determine whether the hydrogen concentration sensor D2 (FIG. 11) provided in the oxidizing gas exhaust pipe 33 detects hydrogen. When hydrogen is detected, it can be assumed that the cathode atmosphere is replaced by hydrogen and that the cathode electrode potential is reduced to or below a preset value.

E-3-3. Third Modification

The sixth to eighth pre-stop processes of the fifth embodiment determine whether the preset time period has elapsed in the gas pressure difference reducing process (step S250 in FIG. 12), but this is not essential. Like the processing of step S140 in the first pre-stop process (FIG. 2) or the processing of step S140a in the second pre-stop process (FIG. 3), the partial pressure difference of a gas component between the anode and the cathode may be used as the criterion of determination.

E-3-4. Fourth Modification

Part of the pipes and the equipment (e.g., fuel gas tank 21 and fuel gas circulation pump 26) in the fuel gas supply/exhaust system 20 and the oxidizing gas supply/exhaust system 30 is utilized to deliver the first gas to the two electrodes according to the above embodiment, but this is not essential. In one application, a gas of the same composition containing the fuel gas may be delivered as the first gas from a tank for storing the gas to the two electrodes through first gas supply pipes connected with the respective electrodes. In this application, the delivery of the first gas may be set to make the total pressures of the two electrodes substantially equal to each other. Delivering the first gas from the same first gas supply source to the two electrodes can readily reduce the partial pressure difference of each gas component between the two electrodes to or below the preset reference value. In other words, filling the gas of the reduced concentration variation containing the fuel gas into the cathode and the anode in the gas delivering process enables the preset condition to be satisfied within a short period of time in the gas pressure difference reducing process.

F. Sixth Embodiment

F-1. Configuration of Sixth Embodiment

Figure 16:
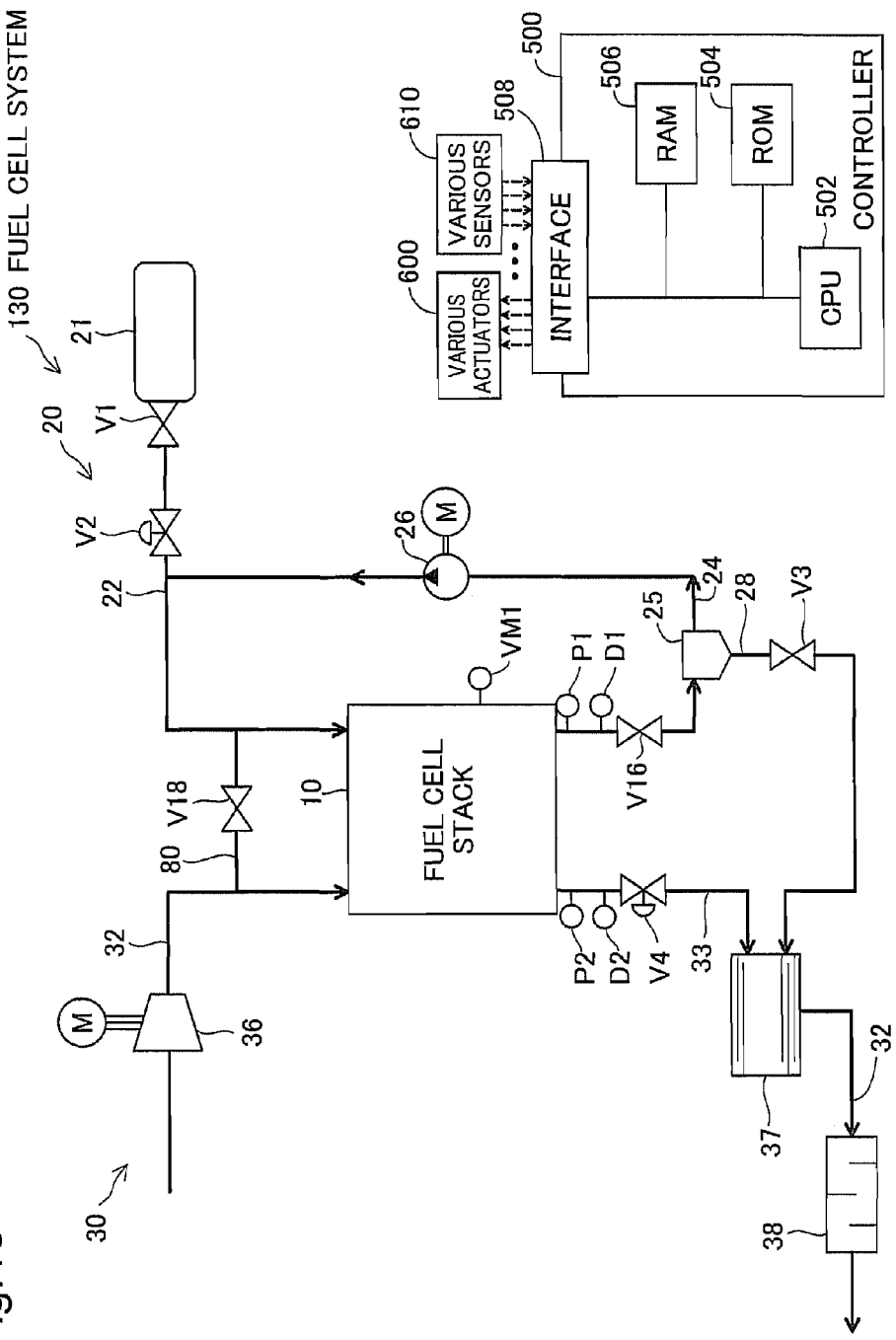
FIG. 16 illustrates the general configuration of an electric vehicle with a fuel cell system 130 according to a sixth embodiment of the invention.

FIG. 16 illustrates the general configuration of an electric vehicle with a fuel cell system 130 according to a sixth embodiment of the invention. The difference from the first embodiment includes addition of a third bypass pipe 80, a relief valve (also called "safety valve") V18 and an anode exit valve V16. Otherwise the sixth embodiment has the similar configuration to that of the first embodiment. The like structures to those of the first embodiment are shown by the like symbols and are not specifically described here. The cooling water system 40, the secondary battery 200, the DC-DC converter 300, the load connector 45, the inverter 400 and the motor 410 (FIG. 1) are omitted from the illustration of the sixth embodiment.

The third bypass pipe 80 is connected with the fuel gas supply pipe 22 and with the oxidizing gas supply pie 32. The relief valve V18 is provided in the third bypass pipe 80. The anode exit valve V16 is provided in the upstream of the gas liquid separator 25 in the fuel gas circulation pipe 24. The pressure sensor P1 and the hydrogen concentrations sensor D1 are provided in the upstream of the anode exit valve V16 in the fuel gas circulation pipe 24.

F-2. Ninth Aspect of Pre-Stop Process

Figure 17:
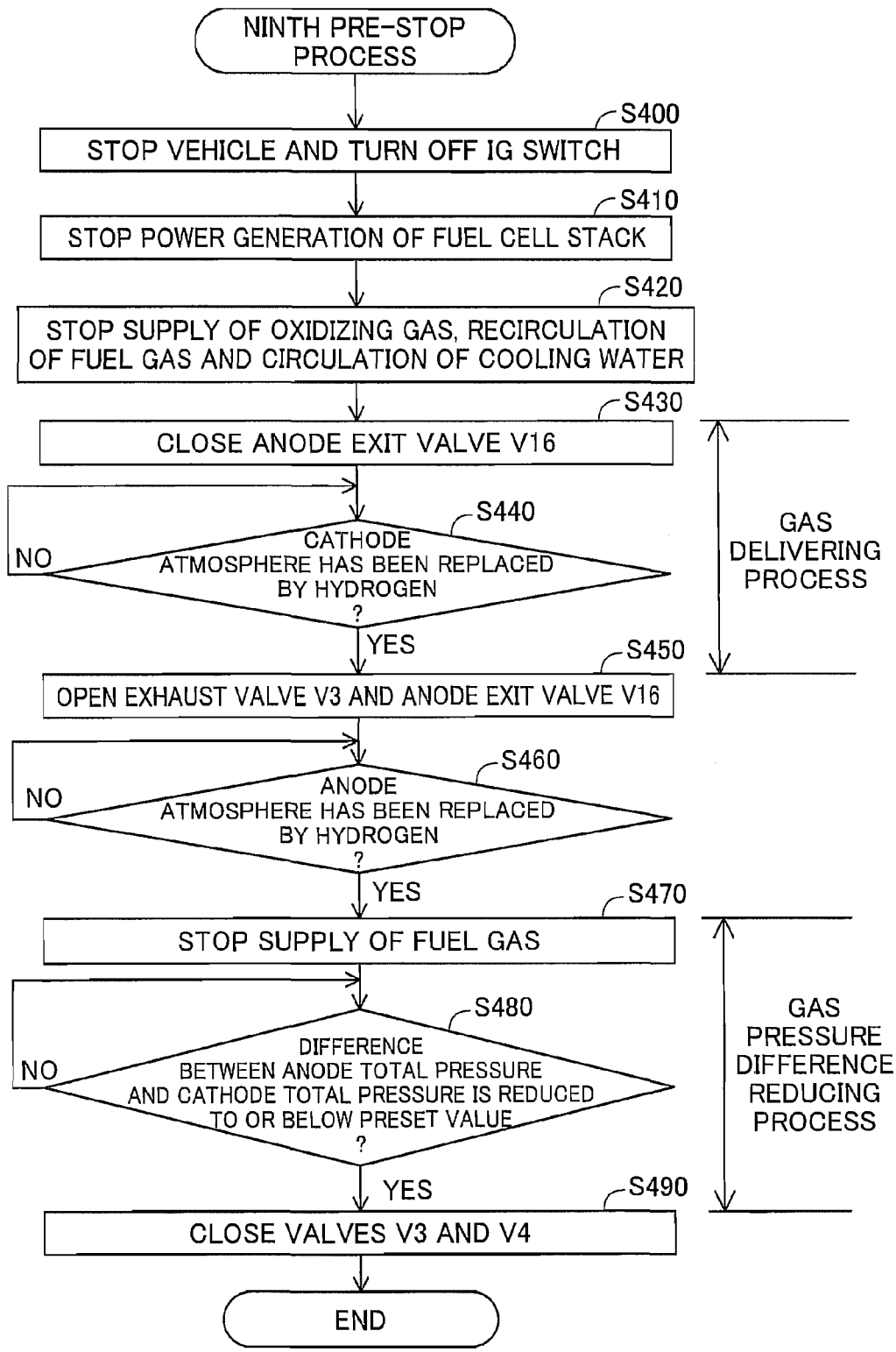
FIG. 17 is a flowchart showing a ninth aspect of pre-stop process.

FIG. 17 is a flowchart showing a ninth aspect of pre-stop process (hereinafter called "ninth pre-stop process") performed by the controller 500 according to the sixth embodiment. When receiving the IG switch OFF signal (step S400), the controller 500 stops power generation of the fuel cell stack 10 (step S410). The controller 500 subsequently stops the supply of the oxidizing gas and stops the operations of the circulation pumps 26 and 46 to stop the recirculation of the fuel gas and the circulation of cooling water (step S420), while continuing the supply of the fuel gas from the fuel gas tank 21.

After step S420, the controller 500 closes the anode exit valve V16 (step S430). This valve closing gradually increases the pressure of the fuel gas supply pipe 22. When the increasing pressure reaches or exceeds a preset level, the relief valve V18 opens to connect the third bypass pipe 80. The fuel gas supplied from the fuel gas tank 21 is then delivered as the first gas to the cathode via the third bypass pipe 80 and the oxidizing gas exhaust pipe 33. This causes oxygen and nitrogen remaining in the cathode to be discharged out of the system. The mechanism of connecting the third bypass pipe 80 to deliver the fuel gas to the cathode herein corresponds to the "first gas supply mechanism" described in Solution to Problem section. The anode exit valve V16 herein corresponds to the "pressure regulator" described in Solution to Problem section.

The controller 500 then determines whether the cathode atmosphere has been replaced by hydrogen (step S440). For example, this determination may be based on whether a preset time period has elapsed, wherein this time period represents a period of time required for replacing the cathode atmosphere by hydrogen after opening the relief valve V18 and determined in advance based on the volume of the cathode and the supply amount of hydrogen from the fuel gas tank 21.

When it is determined that the cathode atmosphere has not yet been replaced by hydrogen (step S440: No), the controller 500 keeps the valve-open state of the relieve valve V18 to continue the supply of the fuel gas. When it is determined that the cathode atmosphere has been replaced by hydrogen (step S440: Yes), on the other hand, the controller 500 opens the exhaust valve V3 and the anode exit valve V16 (step S450). This decreases the pressure of the fuel gas supply pipe 22 and thereby closes the relief valve V18. This also reduces the anode total pressure to the atmospheric pressure level and starts replacing the anode atmosphere by hydrogen.

The controller 500 then determines whether the anode atmosphere has been replaced by hydrogen (step S460). For example, this determination may be based on whether a preset time period has elapsed, wherein this time period represents a period of time required for replacing the anode atmosphere by hydrogen and determined in advance based on the volume of the anode and the supply amount of hydrogen from the fuel gas tank 21.

When it is determined that the anode atmosphere has not yet been replaced by hydrogen (step S460: No), the controller 500 continues the supply of the fuel gas. When it is determined that the anode atmosphere has been replaced by hydrogen (step S460: Yes), on the other hand, the controller 500 stops the supply of the fuel gas (step S470).

The controller 500 subsequently determines whether the difference between the anode total pressure and the cathode total pressure is reduced to or below a preset value (step S480). When it is determined that the total pressure difference is not reduced to or below the preset value (step S480: No), the determination of step S480 is repeated. With elapse of time, the anode total pressure is gradually reduced to the atmospheric pressure level. When it is determined that the total pressure difference is reduced to or below the preset level (step S480: Yes), on the other hand, the controller 500 closes the exhaust valve V3 and the valve V4 (step S490).

As described above, hydrogen can be readily delivered to the cathode by providing the third bypass pipe 80 and the relief valve V18 and increasing the pressure of the fuel gas supply pipe 22 to or above the preset level. The relief valve V18 is more easily controlled than the other valves (e.g., three-way vale), thus facilitating the control in the pre-stop process.

Providing the third bypass pipe 80 and the relief valve 18 suppresses an abrupt increase in pressure of the fuel gas supply/exhaust system 20 (especially the fuel as supply pipe 22) due to some abnormality or trouble (e.g., accumulation of water) during normal operation, and prevents deformation of the electrolyte membrane due to the pressure difference between the anode and the cathode.

The gas pressure difference reducing process is performed to reduce the variation of the cathode total pressure and prevent negative pressure in the cathode. This inhibits oxidation of the cathode component material after the system stop and also prevents negative pressure in the cathode after the system stop. There is accordingly no need to provide a mechanism of the high sealing property at the cathode exit of the fuel cell stack 10 communicating with the atmosphere. This enables cost reduction. Closing the valve V4 at step S490 prevents introduction of the diffused air from outside into the cathode.

F-3. Modifications of Sixth Embodiment

F-3-1. First Modification

The controller 500 determines whether the preset time period has elapsed at step S440 and at step S460, but this is not essential. For example, it may be determined whether the concentration measured by the hydrogen concentration sensor D2 reaches or exceeds a preset level at step S440. Similarly it may be determined whether the concentration measured by the hydrogen concentration sensor D1 reaches or exceeds a preset level at step S460.

F-3-2. Second Modification

At step S430, the controller 500 may further adjust the pressure regulator V2 to increase the supply amount of hydrogen from the fuel gas tank 21 and thereby raise the pressure of the fuel gas supply pipe 22. This enables the pressure of the fuel gas supply pipe 22 to reach or exceed the preset level within a shorter period of time.

F-3-3. Third Modification

The exhaust valve V3 may be used in place of the anode exit valve V16. In other words, the anode exit valve V16 may be omitted. In this application, opening and closing the exhaust valve V3 substitute for opening and closing the anode exit valve V16 at step S430 and at step S450. This application ensures the similar advantageous effects to those of the sixth embodiment.

F-3-4. Fourth Modification

The secondary battery 200 and the DC-DC converter 300 may be omitted from the configuration of the above embodiment. Such omission still enables the gas delivering process.

The invention is not limited to the above embodiments, applications, or modifications but a multiplicity of further variations and modifications may be made to the embodiments without departing from the scope of the invention.

G. Modification Embodiments

G-1. First Modification Embodiment

G-1-1. Configuration of First Modification Embodiment

Figure 18:
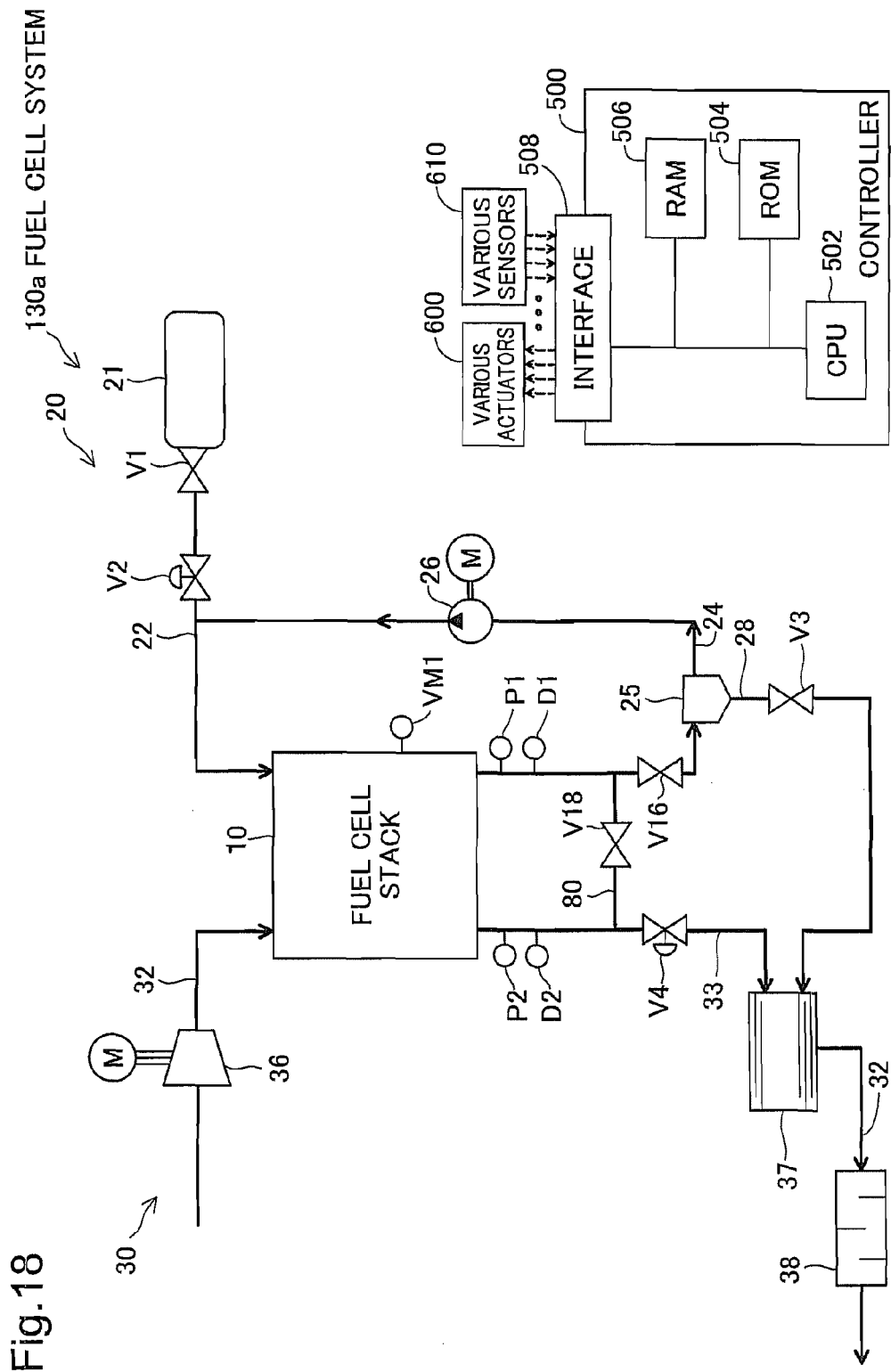
FIG. 18 illustrates the general configuration of an electric vehicle with a fuel cell system 130a according to a first modification embodiment.

FIG. 18 illustrates the general configuration of an electric vehicle with a fuel cell system 130a according to a first modification embodiment. The difference from the sixth embodiment (FIG. 16) includes the position of attachment of the third bypass pipe 80. Otherwise the first modification embodiment has the similar configuration to that of the sixth embodiment. The like structures to those of the sixth embodiment are shown by the like symbols and are not specifically described here.

The third bypass pipe 80 is connected with the oxidizing gas exhaust pipe 33 and the fuel gas circulation pipe 24. More specifically, one end of the third bypass pipe 80 is connected with an upstream section of the oxidizing gas exhaust pipe 33 in the upstream of the valve V4, while the other end is connected with an upstream section of the fuel gas circulation pipe 24 in the upstream of the anode exit valve V16. The relief valve V18 is provided in the third bypass pipe, like the sixth embodiment.

G-1-2. Pre-Stop Process of First Modification Embodiment

Figure 19:
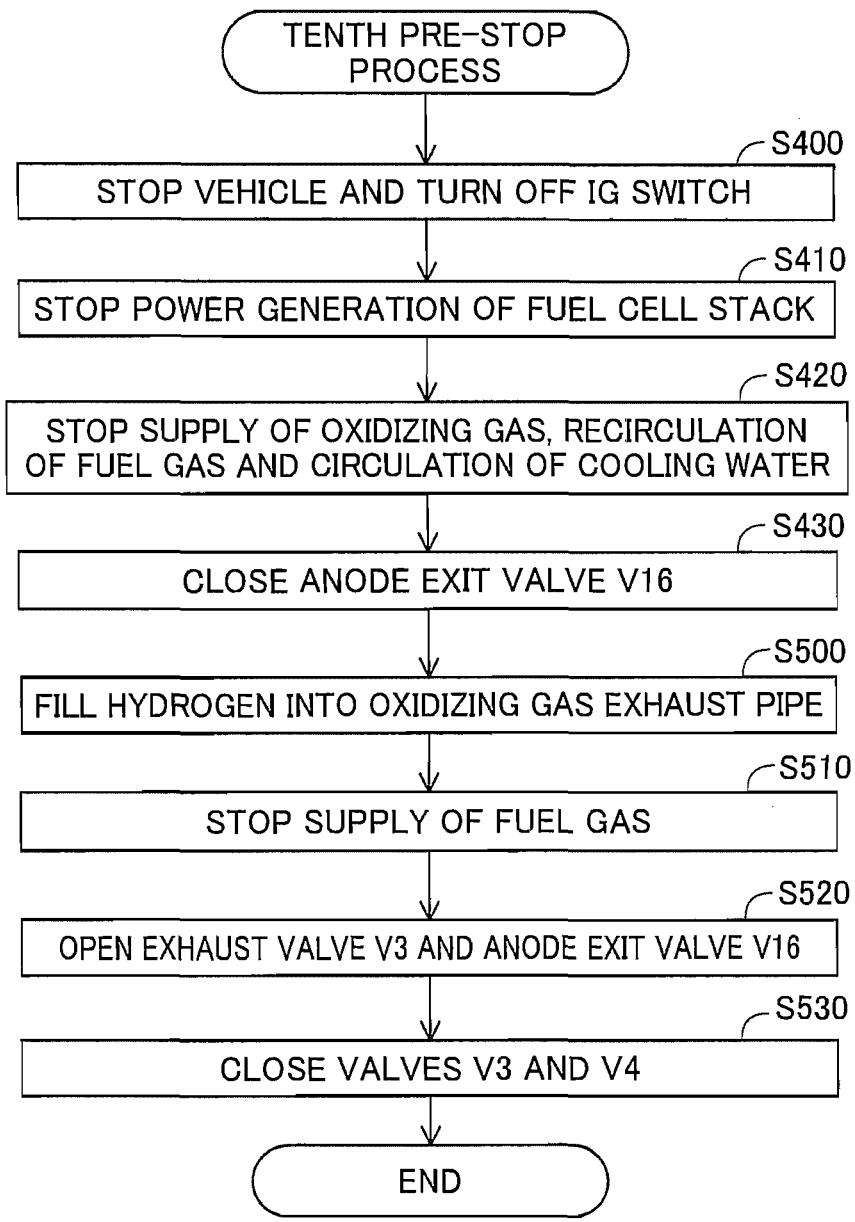
FIG. 19 is a flowchart showing a tenth aspect of pre-stop process.

FIG. 19 is a flowchart showing a tenth aspect of pre-stop process (hereinafter called "tenth pre-stop process") performed by the controller 500 according to the first modification embodiment. The difference from the ninth pre-stop process includes a series of processing after step S430. The like steps to those of the ninth pre-stop process are shown by the like step numbers and are not specifically described here.

When the controller 500 closes the anode exit valve V16 (step S430), the pressure of the fuel gas circulation pipe 24 (more specifically, the upstream section of the pipe 24 in the upstream of the anode exit valve V16) gradually increases. When the increasing pressure reaches or exceeds a preset level, the relief valve opens to fill hydrogen into the oxidizing gas exhaust pipe 33 (step S500). It is determinable whether hydrogen has been filled into the oxidizing gas exhaust pipe 33, based on the hydrogen concentration measured by the hydrogen concentration sensor D2 or based on elapse of a preset time period for completion of hydrogen filling calculated from the volume of the oxidizing gas exhaust pipe 33 and the supply amount of hydrogen. After step S500, the controller 500 stops the supply of the fuel gas (step S510). The controller 500 then opens the exhaust valve V3 and the anode exit valve V16 (step S520) to reduce the pressure of the fuel gas supply/exhaust system 20 to a preset pressure level (e.g., atmospheric pressure level). The controller 500 subsequently closes the exhaust valve V3 and the valve V4 (step S530).

As described above, the tenth pre-stop process fills the oxidizing gas exhaust pipe 33 with hydrogen and thereby prevents introduction of oxygen to the cathode even when negative pressure is generated in the cathode after the system stop. This advantageously inhibits oxidation of the cathode component material. The exhaust valve V3 may be used in place of the anode exit valve V16. In other words, the anode exit valve V16 may be omitted.

The valve V4 may be omitted from the configuration of the first modification embodiment. Even when negative pressure is generated in the cathode, hydrogen filled in the oxidizing gas exhaust pipe 33 flows into the cathode and prevents introduction of oxygen to the cathode.

G-2. Second Modification Embodiment

Figure 20:
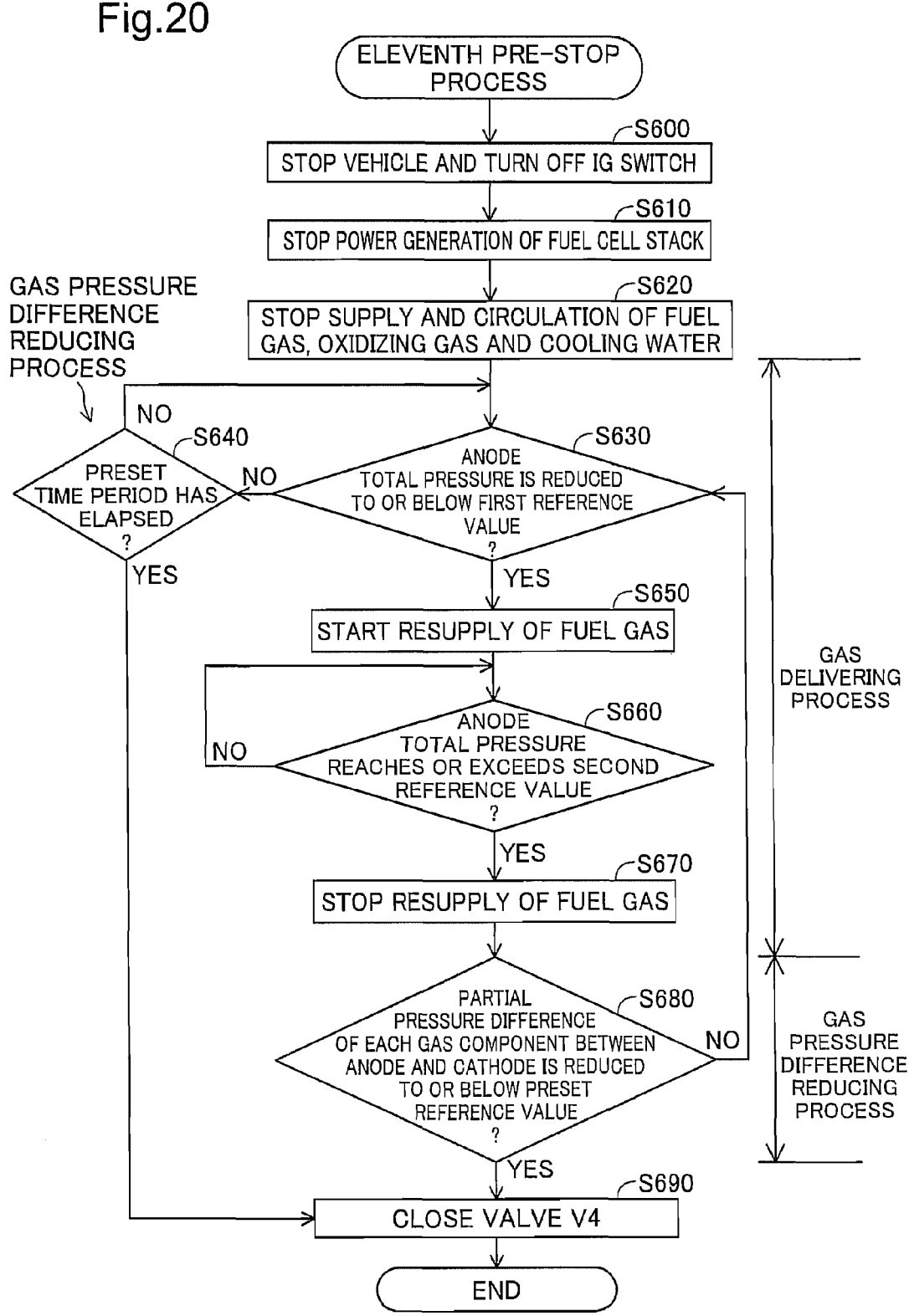
FIG. 20 is a flowchart showing an eleventh aspect of pre-stop process.

FIG. 20 is a flowchart showing an eleventh aspect of pre-stop process (hereinafter called "eleventh pre-stop process") performed by the controller 500 according to a second modification embodiment.

When the user stops the vehicle and turns off the IG switch, the IG switch OFF signal is input into the controller 500 (step S600). The controller 500 then stops power generation of the fuel cell stack 10 (step S610) and stops the supply and circulation of the reactive gases (fuel gas and oxidizing gas) and cooling water (step S620).

The controller 500 subsequently determines whether the anode total pressure is reduced to or below a first reference value (step S630). The first reference value may be a criterion value to determine whether the hydrogen in the anode has decreased from the level before the pre-stop process by the migration of hydrogen from the anode to the cathode. In this aspect, the first reference value is set to about 90 kPa, which is lower than the atmospheric pressure.

When it is determined that the anode total pressure is not reduced to or below the first reference value (step S630: No), the controller 500 determines whether a preset time period has elapsed since the stop of power generation (step S640). When it is determined that the preset time period has not yet elapsed (step S640: No), the determination of step S630 is repeated. When it is determined that the preset time period has elapsed (step S640: Yes), the controller 500 closes the valve V4 and terminates the pre-stop process. The pre-stop process is terminated on elapse of the preset time period, because of the following reason. When the condition of step S630 is not satisfied even after elapse of the preset time period, it is assumed that the anode total pressure is in a range between the first reference value and a second reference value explained below and hardly varies, due to substantially no migration of hydrogen from the anode to the cathode by the hydrogen partial pressure difference between the two electrodes as the driving force. It is accordingly determinable that at least the hydrogen partial pressure difference between the two electrodes is reduced to or below a preset reference value (e.g., the partial pressures in the two electrodes are substantially equal to each other), when the condition of step S630 is not satisfied even after elapse of the preset time period.

When it is determined that the condition of step S630 is satisfied, the controller 500 starts resupply of the fuel gas to the anode (step S650). At this moment, the operation of the fuel gas circulation pump 26 is resumed.

The controller 500 subsequently determines whether the anode total pressure reaches or exceeds a second reference value (step S660). When it is determined that the anode total pressure does not reach or exceed the second reference value (step S660: No), the resupply of the fuel gas continues. When it is determined that the anode total pressure reaches or exceeds the second reference value (step S660: Yes), on the other hand, the controller 500 stops the resupply of the fuel gas (step S670). At step S670, the recirculation of the fuel gas by the fuel gas circulation pump 26 is also stopped. The second reference value may be set in a range that prevents deformation of the electrolyte membrane due to the total pressure difference between the two electrodes. In this aspect, the second reference value is set to about the atmospheric pressure level, like the cathode total pressure. The condition of step S660 may be whether a preset time period has elapsed, instead of whether the anode total pressure reaches or exceeds the second reference value. A period of time required for supplying a certain amount of hydrogen corresponding to the decreased amount to the anode may be calculated from the supply amount of hydrogen and the decreased amount of hydrogen in the anode, and the calculated period of time may be set to this time period.

The controller 500 then determines whether the partial pressure difference of each remaining gas component, i.e., hydrogen and nitrogen, between the two electrodes is reduced to or below a preset reference value (step S680). The same criterion as that of step S140a in the second pre-stop process may be employed for the reference value for the partial pressure difference of hydrogen or nitrogen.

When it is determined that the partial pressure difference does not satisfy the preset condition (step S680: No), the controller 500 returns to the determination of step S630. When it is determined that the partial pressure difference satisfies the preset condition (step S680: Yes), the controller 500 closes the valve V4 (step S690). The mechanism of delivering hydrogen from the anode to the cathode by the hydrogen partial pressure difference between the two electrodes as the driving force herein corresponds to the "first gas supply mechanism" described in Solution to Problem section.

As described above, the eleventh pre-stop process reduces the partial pressure difference of each gas component, i.e., hydrogen and nitrogen, between the two electrodes, thus reducing the variation of the cathode total pressure and preventing negative pressure in the cathode. This effectively inhibits oxidation of the cathode component material after the system stop. Additionally, there is no need to provide a mechanism of the high sealing property, such as shutoff valve, in the oxidizing gas exhaust pipe 33, like the first embodiment.

The valve V4 may also be omitted from the configuration of this modification embodiment. Even the configuration with such omission can prevent negative pressure in the cathode and resulting introduction of the air from outside the system into the cathode, thus inhibiting oxidation of the cathode component material. The pre-stop process of this aspect does not take advantage of the hydrogen pumping effect in the gas delivering process, so that the secondary battery 200 and the DC-DC converter 300 may be omitted from the fuel cell system 100 (FIG. 1).

G-3. Third Modification Embodiment

G-3-1. Configuration of Third Modification Embodiment

Figure 21:
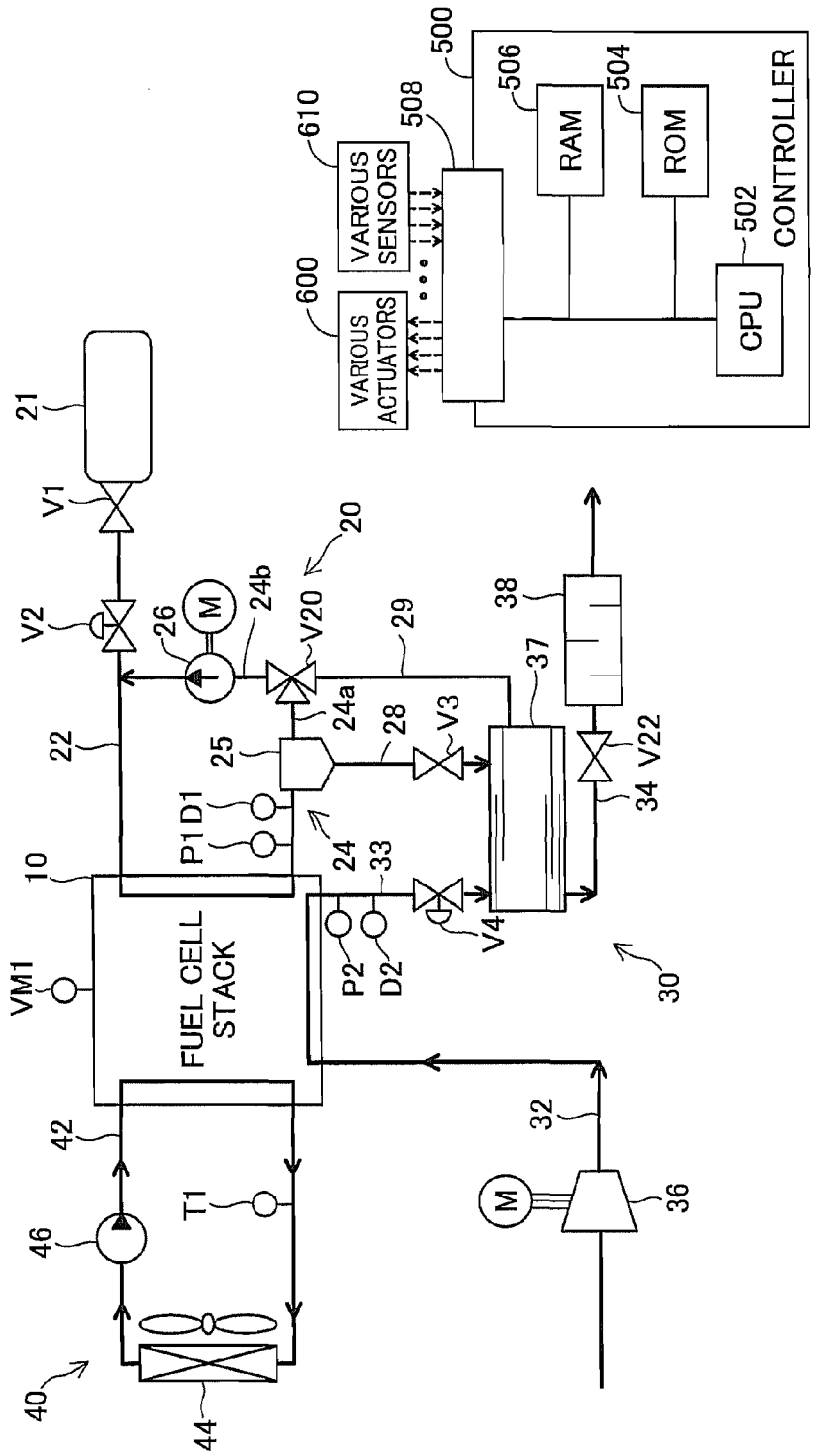
FIG. 21 illustrates the general configuration of an electric vehicle with a fuel cell system 140 according to a third modification embodiment.

FIG. 21 illustrates the general configuration of an electric vehicle with a fuel cell system 140 according to a third modification embodiment. The difference from the first embodiment includes addition of a return pipe 29, a three-way valve V20 and a valve V22. Otherwise the third modification embodiment has the similar configuration to that of the first embodiment. The like structures to those of the first embodiment are shown by the like symbols and are not specifically described here. The secondary battery 200, the DC-DC converter 300, the load connector 45, the inverter 400 and the motor 410 are omitted from the illustration of the fuel cell system 140.

The return pipe 29 is connected with the diluter 37 and with the fuel gas circulation pipe 24. The three-way valve V20 is provided at the joint between the return pipe 29 and the fuel gas circulation pipe 24. The valve V22 is provided in the piping 34. An upstream section of the fuel gas circulation pipe 24 in the upstream of the three-way valve V20 is called upstream pipe 24a, and a downstream section in the downstream of the three-way valve V20 is called downstream pipe 24b.

G-3-2. Twelfth Aspect of Pre-Stop Process

Figure 22:
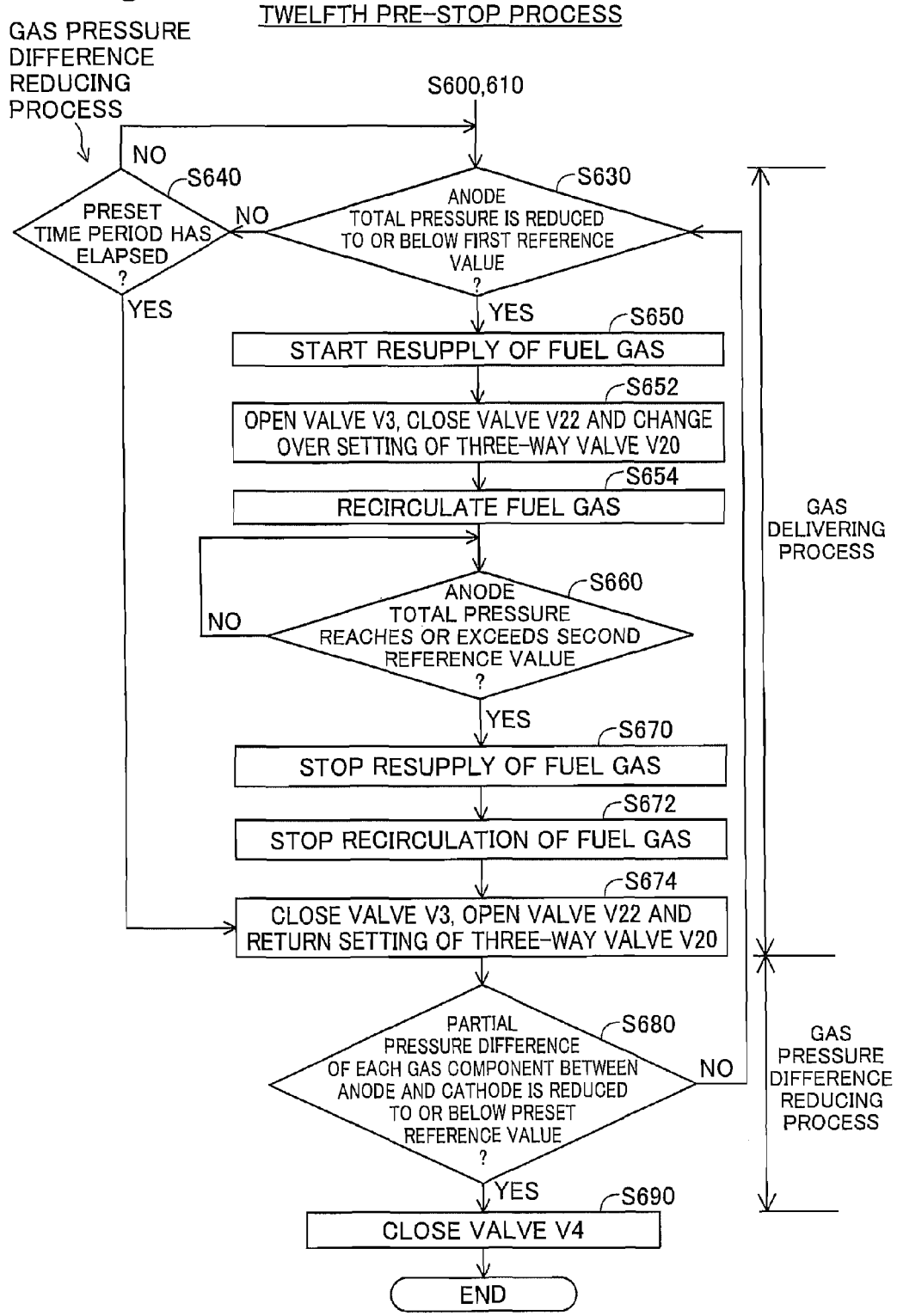
FIG. 22 is a flowchart showing a twelfth aspect of pre-stop process.

FIG. 22 is a flowchart showing a twelfth aspect of pre-stop process (hereinafter called "twelfth pre-stop process") performed by the controller 500 according to the third modification embodiment. The difference from the eleventh pre-stop process includes the method of supplying and recirculating the fuel gas after step S630. The like steps to those of the eleventh pre-stop process are shown by the like step numbers and are not specifically described here.

When it is determined that the condition of step S630 is satisfied (step S630: Yes), the controller 500 starts resupply of the fuel gas (step S650). The controller 500 also opens the valve V3, closes the valve V22 and changes over the port open-close setting of the three-way valve V20 to connect the return pipe 29 with the downstream pipe 24b (step S652). The connection between the return pipe 29 and the downstream pipe 24b forms a fuel gas circulation path. The controller 500 then restarts the operation of the fuel gas circulation pump 26 to recirculate the fuel gas (step S654). The processing of steps S650 to S654 may be performed in no particular order but at any arbitrary timing.

When it is determined that the condition of step S660 is satisfied (step S660: Yes), the controller 500 stops the resupply and recirculation of the fuel gas (steps S670 and S672). The controller 500 then closes the valve V3, opens the valve V22, and returns the port open-close setting of the three-way valve V20 to the original setting, so as to connect the upstream pipe 24a with the downstream pipe 24b (step S674). The processing of steps S670 to S674 may be performed in no particular order but at any arbitrary timing.

As described above, the twelfth pre-stop process recirculates the fuel gas via the diluter, so as to further agitate the gas. The gas of the further reduced concentration variation is accordingly supplied to the anode via the fuel gas supply pipe 22. This prevents the occurrence of a hydrogen deficient part in the anode of each unit cell, where hydrogen is partially deficient and the resulting generation of cathode abnormal potential. The gas pressure difference reducing process (step S680) is performed to reduce the variation of the cathode total pressure and prevent introduction of the air from outside the system into the cathode after the system stop. This advantageously inhibits oxidation of the cathode component material.

G-3-3. Thirteenth Aspect of Pre-Stop Process

Figure 23:
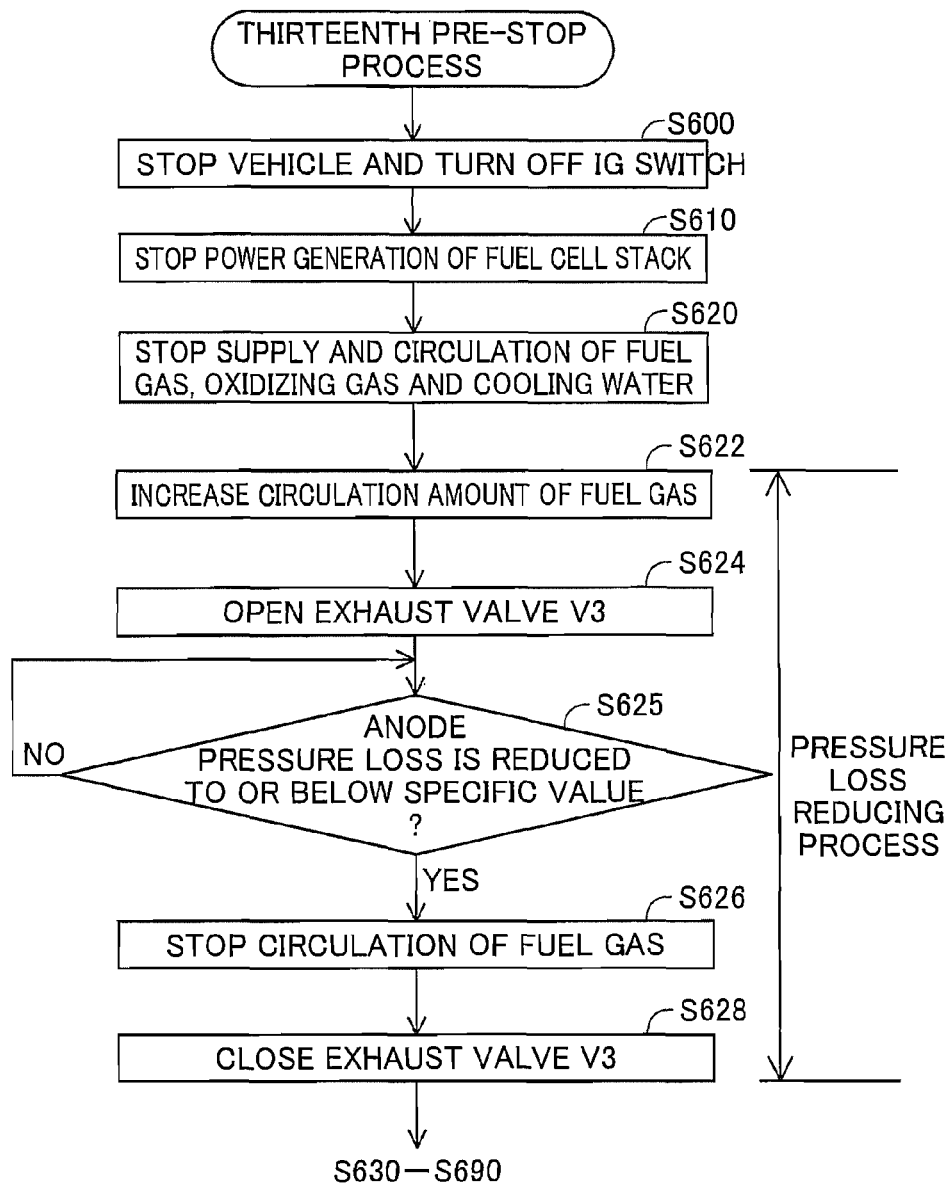
FIG. 23 is a flowchart showing a thirteenth aspect of pre-stop process.

FIG. 23 is a flowchart showing a thirteenth aspect of pre-stop process (hereinafter called "thirteenth pre-stop process") performed by the controller 500 according to the third modification embodiment. The difference from the twelfth pre-stop process includes providing a pressure loss reducing process to reduce the pressure loss in the anode, prior to determining that the anode total pressure is reduced to or below the first reference value and starting resupply of the fuel gas (steps S630 and S650). The like steps to those of the twelfth pre-stop process are shown by the like step numbers and are not specifically described here. In order to measure the pressure loss in the anode, a supply-side pressure sensor is newly provided in the fuel gas supply pipe 22 in the vicinity of the fuel gas supply port of the fuel cell stack 10 in the fuel cell system 140 (FIG. 21). The controller 500 computes the pressure loss in the anode, based on the measurements of the supply-side pressure sensor and the pressure sensor P1 provided on the fuel gas exhaust side. The pressure loss reducing process of this aspect may be applied to the eleventh pre-stop process (FIGS. 1 and 20).

After step S620, the controller 500 restarts the operation of the fuel gas circulation pump 26 and increases the rotation speed of the pump 26 above the level during normal operation to increase the circulation amount of the fuel gas (step S622). The controller 500 subsequently opens the exhaust valve V3. This causes the water accumulated in the anode to be discharged out via the fuel gas circulation pipe 24 and the fuel gas exhaust pipe 28 and reduces the pressure loss in the anode.

The controller 500 then determines whether the pressure loss in the anode is reduced to or below a specific value (step S625). The specific value may be set in a range less than the pressure loss level at the stop of power generation of the fuel cell stack (step S610). It is preferable to set the specific value to the pressure loss level prior to the start of normal operation of the fuel cell system (i.e., the pressure loss level in the state where substantially no water is accumulated in the anode). When it is determined that the pressure loss in the anode is not reduced to or below the specific value (step S625: No), the controller 500 repeats the determination of step S625. When it is determined that the pressure loss in the anode is reduced to or below the specific value (step S625: Yes), on the other hand, the controller 500 stops the operation of the fuel gas circulation pump 26 to stop the circulation of the fuel gas (step S626). The controller 500 then closes the exhaust valve V3. The processing of steps S622 and S624 may be performed in no particular order. The processing of steps S626 and S628 may also be performed in no particular order.

As described above, the pressure loss reduction process (steps S622 to S628) prior to starting the resupply of the fuel gas enables the fuel gas to be evenly distributed to each unit cell before the resupply of the fuel gas. This prevents the occurrence of a hydrogen deficient part in the anode of each unit cell and the resulting generation of cathode abnormal potential. This also inhibits oxidation of the cathode component material after the system stop, like the twelfth pre-stop process.

In the configuration of the fuel cell system 140 (FIG. 21) according to the third modification embodiment, one end of the return pipe 29 is connected with the diluter 37. This structure is, however, not essential, and any other structure may be employed as the mechanism to further agitate the gas. For example, one end of the return pipe 29 may be connected with the muffler 38. This structure also ensures sufficient agitation of the gas. Instead of providing the return pipe 28, the fuel gas supply pipe 22 may be structured to have a larger-diameter part or a baffle plate may be provided in the anode manifold of the fuel cell stack 140, through which the fuel gas flows.

G-4. Fourth Modification Embodiment

The fuel cell system is mounted on the vehicle in the embodiments and modification embodiments described above, but this is not restrictive. The fuel cell system may be used in various other applications. For example, the fuel cell system may be employed in a home cogeneration system. In this application, for example, the home cogeneration system may be designed to have a power generation stop button of the fuel cell stack. When the user presses the power generation stop button, the controller 500 may receive a power generation stop button ON signal and perform any of the first to the thirteenth pre-stop processes.

G-5. Fifth Modification Embodiment

In the pre-stop processes described above, part of the anode supply/exhaust system and the cathode supply/exhaust system used for the normal operation, such as "hydrogen pumping effect", "low air stoichiometric ratio operation" or "open-close setting of the relief valve", is utilized to deliver the fuel gas-containing gas to the cathode in the gas delivering process. The gas delivering method is, however, not limited to this method. For example, a processing fuel gas tank for delivering the hydrogen-containing gas to the cathode during the pre-stop process may be provided separately. The fuel gas-containing gas (e.g., hydrogen gas or gas mixture of hydrogen and nitrogen) may be delivered from the gas tank to the cathode. In this application, the gas pressure difference reducing process is performed to inhibit oxidation of the cathode component material after the system stop. The pre-stop process delivers the hydrogen-containing gas to the cathode, but this is not essential. For example, the pre-stop process may replace the cathode atmosphere or the anode atmosphere by an inert gas, such as methane or nitrogen and thereby reduce the partial pressure difference of each gas component between the two electrodes to or below a preset reference value. This application also reduces the variation of the cathode total pressure and inhibits oxidation of the cathode component material after the system stop.

The invention claimed is:

1. A fuel cell system, comprising:
a first fuel cell structured to have an anode and a cathode provided across an electrolyte membrane, wherein the first fuel cell generates electric power with supply of hydrogen as a fuel gas to the anode and supply of the air as an oxidizing gas to the cathode;
a first gas supply mechanism configured to deliver a first gas containing a fuel gas to the cathode; and
a controller programmed to control operation of the fuel cell system, wherein
the controller is programmed to control the first gas supply mechanism to deliver the first gas to the cathode in a pre-stop process performed at a system stop of the fuel cell system, and
the controller is programmed to control the first gas supply mechanism to stop the delivery of the first gas in a second state where a partial pressure difference of each gas component between the anode and the cathode with respect to nitrogen and the fuel gas remaining in the anode and in the cathode is reduced to or below a preset reference value.

2. The fuel cell system according to claim 1, further comprising:
an anode gas supply/exhaust system configured to supply and discharge the fuel gas to and from the anode during normal power generation of the first fuel cell; and
a cathode gas supply/exhaust system configured to supply and discharge an oxidizing gas to and from the cathode during normal power generation of the first fuel cell, wherein
the first gas supply mechanism comprises a first power supply configured to apply a predetermined voltage to the first fuel cell, and
in the pre-stop process, after controlling the cathode gas supply/exhaust system to stop the supply of the oxidizing gas to the cathode, while continuing the supply of the fuel gas to the anode by the anode gas supply/exhaust system, the controller is programmed to control the first power supply to apply the predetermined voltage to the first fuel cell, so as to deliver the fuel gas as the first gas to the cathode via the first gas supply mechanism.

3. The fuel cell system according to claim 2, further having:
a first drive mode in which concentration of oxygen remaining in the cathode is reduced below a level before start of the pre-stop process, wherein
before controlling the first gas supply mechanism to deliver the first gas to the cathode, the controller is programmed to set the first drive mode to reduce the concentration of oxygen remaining in the cathode to a specific condition below the level before start of the pre-stop process.

4. The fuel cell system according to claim 1, wherein
the controller is programmed to set a smaller stoichiometric ratio to the first fuel cell than a stoichiometric ratio of an oxidizing gas supplied to the cathode during normal power generation and controls the first fuel cell to start power generation with the smaller stoichiometric ratio, so as to deliver the first gas to the cathode by the first gas supply mechanism.

5. The fuel cell system according to claim 4, further comprising:
a temperature sensor configured to measure a value relating to temperature of a power generation assembly of the first fuel cell, wherein
the controller is programmed to control the first gas supply mechanism to deliver the first gas to the cathode in the pre-stop process, when the temperature of the power generation assembly of the first fuel cell based on the measurement value of the temperature sensor is higher than 0° C., and
the controller is programmed to stop the fuel cell system without controlling the first gas supply mechanism to deliver the first gas to the cathode, when the temperature of the power generation assembly of the first fuel cell based on the measurement value of the temperature sensor is not higher than 0° C.

6. The fuel cell system according to claim 1, wherein
the first gas supply mechanism comprises a first gas circulation mechanism configured to recirculate at least part of a first exhaust gas discharged from the cathode during the pre-stop process as the first gas to the cathode.

7. The fuel cell system according to claim 6, wherein
the first gas supply mechanism further comprises a fuel gas separating mechanism configured to separate the fuel gas from the first exhaust gas, and
the fuel gas separated by the fuel gas separating mechanism is delivered to the cathode by the first gas circulation mechanism.

8. The fuel cell system according to claim 7, wherein
the fuel gas separating mechanism comprises:
a second fuel cell structured to have an anode and a cathode provided across an electrolyte membrane; and
a second power supply configured to apply a predetermined voltage to the second fuel cell, and wherein
the controller is programmed to control the second power supply to apply the predetermined voltage to the second fuel cell, so as to separate the fuel gas from the first exhaust gas by the second fuel cell.

9. The fuel cell system according to claim 1, wherein
the first gas supply mechanism comprises an anode supply mechanism configured to supply the first gas to the anode, and
the controller is programmed to control the first gas supply mechanism to supply the first gas to the anode in addition to the cathode in the pre-stop process.

10. The fuel cell system according to claim 9, wherein
the first gas supply mechanism further comprises an exhaust gas circulation mechanism configured to mix exhaust gases discharged from the cathode and the anode, out of the first gas supplied to the anode and the cathode, and recirculate the mixed exhaust gases as the first gas to the anode and the cathode.

11. The fuel cell system according to claim 10, further comprising:
an anode gas supply/exhaust system configured to supply and discharge the fuel gas to and from the anode during normal power generation of the first fuel cell; and
a cathode gas supply/exhaust system configured to supply and discharge an oxidizing gas to and from the cathode during normal power generation of the first fuel cell, wherein
the first gas is gas mixture obtained by mixing gases remaining in the anode pas supply/exhaust system and in the cathode pas supply/exhaust system, after the controller stops the supply of the fuel gas and the supply of the oxidizing gas by the anode pas supply/exhaust system and the cathode pas supply/exhaust system.

12. The fuel cell system according to claim 11, further comprising:
a potential processing mechanism configured to reduce an electrode potential of the cathode below a level before start of the pre-stop process, wherein
the controller is programmed so that the controller controls the potential processing mechanism to reduce the electrode potential of the cathode to a specific condition below the level before start of the pre-stop process, before controlling the first gas supply mechanism to supply the first gas to the anode and the cathode.

13. The fuel cell system according to claim 12, wherein
the potential processing mechanism comprises an anode remaining gas supply mechanism configured to supply an anode remaining gas remaining in the anode gas supply/exhaust system, and wherein
the controller is programmed to control the anode remaining gas supply mechanism to deliver the anode remaining gas to the cathode and cause oxygen remaining in the cathode to be discharged out of the cathode, so as to achieve the specific condition.

14. The fuel cell system according to claim 1, further comprising:
an anode gas supply/exhaust system configured to supply and discharge the fuel gas to and from the anode during normal power generation of the first fuel cell;
a cathode gas supply/exhaust system configured to supply and discharge an oxidizing gas to and from the cathode during normal power generation of the first fuel cell; and
a pressure regulator configured to regulate gas pressure in the anode gas supply/exhaust system, wherein
the first gas supply mechanism comprises:
a bypass flow path configured to connect the anode gas supply/exhaust system with the cathode gas supply/exhaust system; and
a first mechanism provided in the bypass flow path and configured to connect the bypass flow path when pressure in an anode gas supply/exhaust system side of the bypass flow path reaches or exceeds a preset level and to disconnect the bypass flow path when the pressure in the anode gas supply/exhaust system side of the bypass flow path does not reach or exceed the preset level, and wherein
when controlling the first gas supply mechanism to deliver the first gas to the cathode, the controller is programmed so that the controller stops the supply of the oxidizing gas to the cathode by the cathode gas supply/exhaust system, while continuing the supply of the fuel gas by the anode gas supply/exhaust system, and
the controller is programmed to control the pressure regulator to regulate the pressure of the anode gas supply/exhaust system to or above the preset level and thereby connect the bypass flow path, so as to introduce the fuel gas as the first gas through the bypass flow path into the cathode gas supply/exhaust system.

15. The fuel cell system according to claim 14, wherein the first mechanism is a relief valve.

16. A method of stopping a fuel cell system comprising a fuel cell structure to have an anode and a cathode provided across an electrolyte membrane, wherein the first fuel cell generates electric power with supply of hydrogen as a fuel gas to the anode and supply of the air as an oxidizing gas to the cathode, the method comprising:
delivering a first gas containing a fuel gas to the cathode; and
stopping the delivery of the first gas after a partial pressure difference of each gas component between the anode and the cathode with respect to nitrogen and the fuel gas remaining in the anode and in the cathode is reduced to or below a preset reference value.

* * * * *

UNITED STATES PATENT AND TRADEMARK OFFICE
CERTIFICATE OF CORRECTION

Page 1 of 1

PATENT NO. : 8,932,772 B2
APPLICATION NO. : 13/500736
DATED : January 13, 2015
INVENTOR(S) : Hideyuki Kumei et al.

It is certified that error appears in the above-identified patent and that said Letters Patent is hereby corrected as shown below:

In the Specification

At column 22, line 41, change "the third second embodiment" to -- the second embodiment --.

In the Claims

At column 38, line 65, in claim 11, change "anode pas supply/exhaust" to -- anode gas supply/exhaust --.

At column 38, line 66, in claim 11, change "cathode pas supply/exhaust" to -- cathode gas supply/exhaust --.

At column 39, line 1, in claim 11, change "anode pas supply/exhaust" to -- anode gas supply/exhaust --.

At column 39, line 2, in claim 11, change "cathode pas supply/exhaust" to -- cathode gas supply/exhaust --.

Signed and Sealed this
Twenty-second Day of September, 2015

Michelle K. Lee
*Director of the United States Patent and Trademark Office*